United States Patent [19]

Cowart

[11] Patent Number: 5,357,541
[45] Date of Patent: Oct. 18, 1994

[54] TRANSCEIVER PROVIDING SELECTABLE FREQUENCIES AND SPREADING SEQUENCES

[75] Inventor: Brooks E. Cowart, Mountain View, Calif.

[73] Assignee: Echelon Corporation, Palo Alto, Calif.

[21] Appl. No.: 20,589

[22] Filed: Apr. 29, 1993

Related U.S. Application Data

[63] Continuation of Ser. No. 830,121, Jan. 30, 1992, Pat. No. 5,189,683, which is a continuation of Ser. No. 684,038, Apr. 11, 1991, Pat. No. 5,146,471, which is a continuation-in-part of Ser. No. 328,058, Mar. 23, 1989, Pat. No. 4,979,183.

[51] Int. Cl.$^5$ .............................................. H04K 1/10
[52] U.S. Cl. ........................................... 375/1; 380/34
[58] Field of Search ............................... 375/1; 380/34

[56] References Cited

U.S. PATENT DOCUMENTS

| | | |
|---|---|---|
| 3,244,986 | 4/1966 | Rumble . |
| 3,665,474 | 5/1972 | Thayer . |
| 4,222,115 | 9/1980 | Cooper et al. ............... 375/1 |
| 4,351,064 | 9/1982 | Ewanus ........................ 375/1 |
| 4,435,822 | 3/1984 | Spencer et al. ............... 375/1 |
| 4,481,640 | 11/1984 | Chow et al. .................. 375/1 |
| 4,653,076 | 3/1987 | Jerrim et al. ................ 375/1 |
| 4,672,629 | 6/1987 | Beier ........................... 375/1 |
| 4,672,658 | 6/1987 | Kavehrad et al. ............. 375/1 |
| 4,703,474 | 10/1987 | Foschini et al. .............. 375/1 |
| 4,707,839 | 11/1987 | Andren et al. . |
| 4,759,034 | 7/1988 | Nagazumi .................... 375/1 |
| 4,815,106 | 3/1989 | Propp et al. ................. 375/1 |
| 4,821,120 | 4/1989 | Tomlinson .................... 375/1 |
| 4,922,506 | 5/1990 | McCallister et al. . |
| 4,930,140 | 5/1990 | Cripps et al. . |
| 4,942,591 | 7/1990 | Nease et al. . |
| 4,943,975 | 7/1990 | Kurihara et al. . |
| 4,964,138 | 10/1990 | Nease et al. . |
| 4,979,183 | 12/1990 | Cowart . |
| 5,016,255 | 5/1991 | Dixon et al. . |
| 5,022,047 | 6/1991 | Dixon et al. . |
| 5,029,180 | 7/1991 | Cowart . |
| 5,146,471 | 9/1992 | Cowart . |

Primary Examiner—David C. Cain
Attorney, Agent, or Firm—Blakely, Sokoloff, Taylor & Zafman

[57] ABSTRACT

A transceiver for transmitting and receiving digital data is disclosed. The transceiver employs direct sequence spread spectrum communications techniques for reducing interference among multiple users in a communications network environment. Each transceiver has a transmitter for locking a digital bit stream to a predetermined spread spectrum chip sequence and carrier signal. Frequency of the carrier signal and the chip sequence. Both the carrier signal, the chip sequence and the bit stream rate are derived from an integrally related to an accurate reference frequency to facilitate rapid acquisition and decoding of the signal by another transceiver. To provide for multiple communications channels on a single transmission medium, means for producing selectable carrier frequencies and/or selectable spreading sequences are included. The transceiver also has a receiver portion for acquiring and decoding a transmitted and direct sequence spread spectrum signal to recover the digital bit stream using the spread spectrum chip sequence and carrier signal.

1 Claim, 13 Drawing Sheets

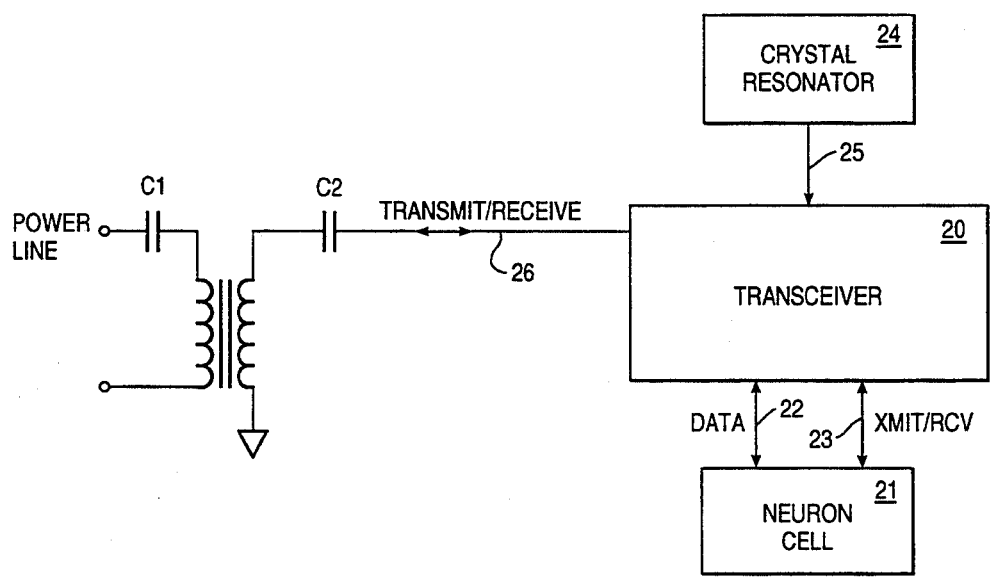
FIG_1
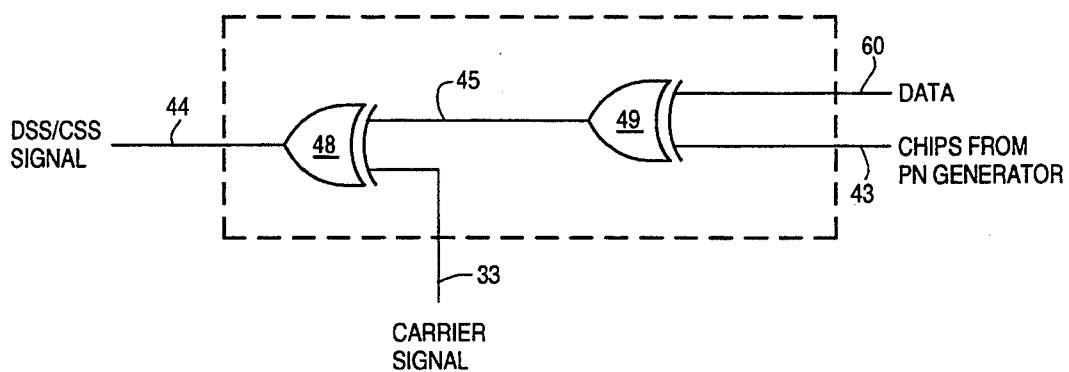
FIG_3

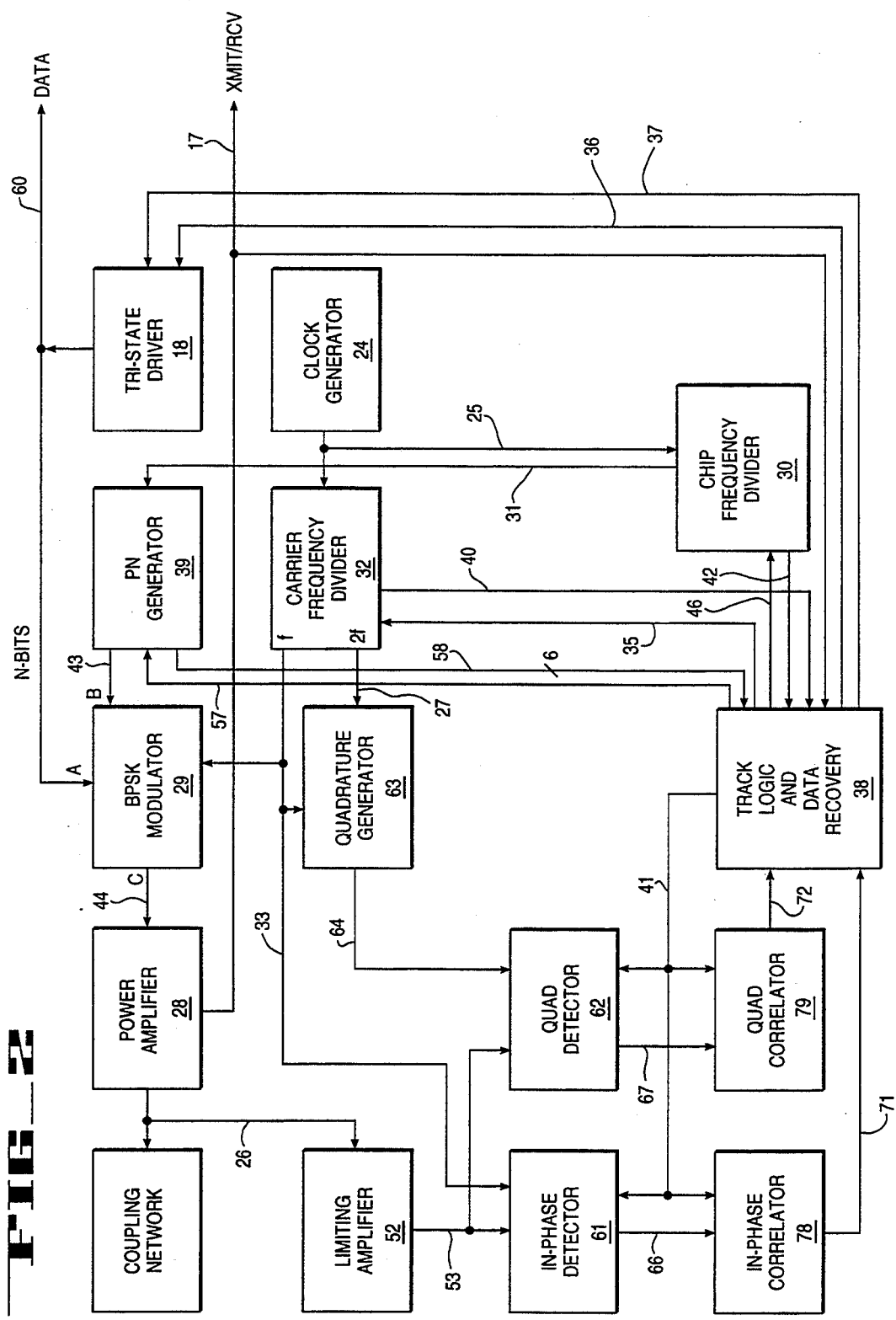

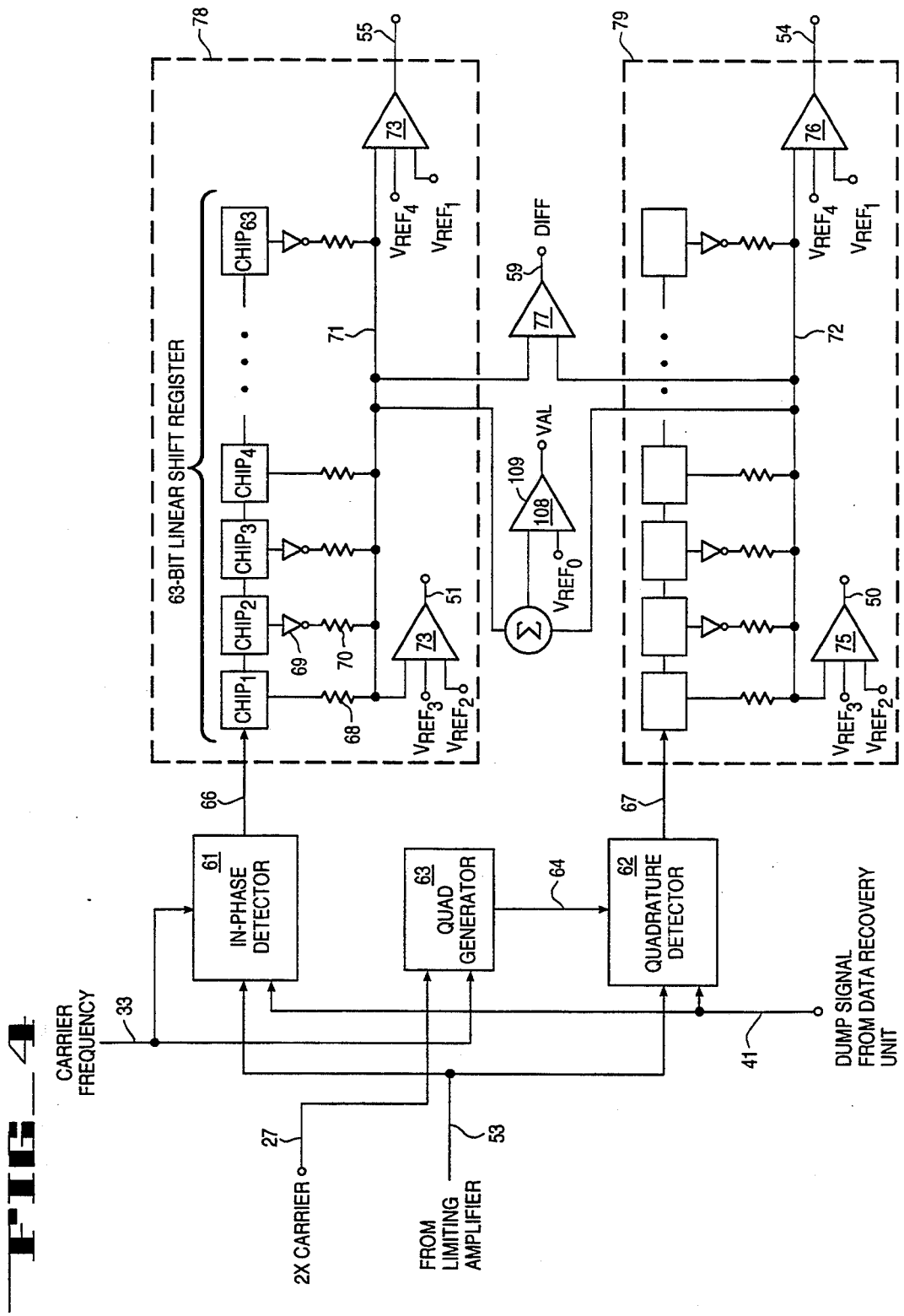
FIG._4

FIG_5
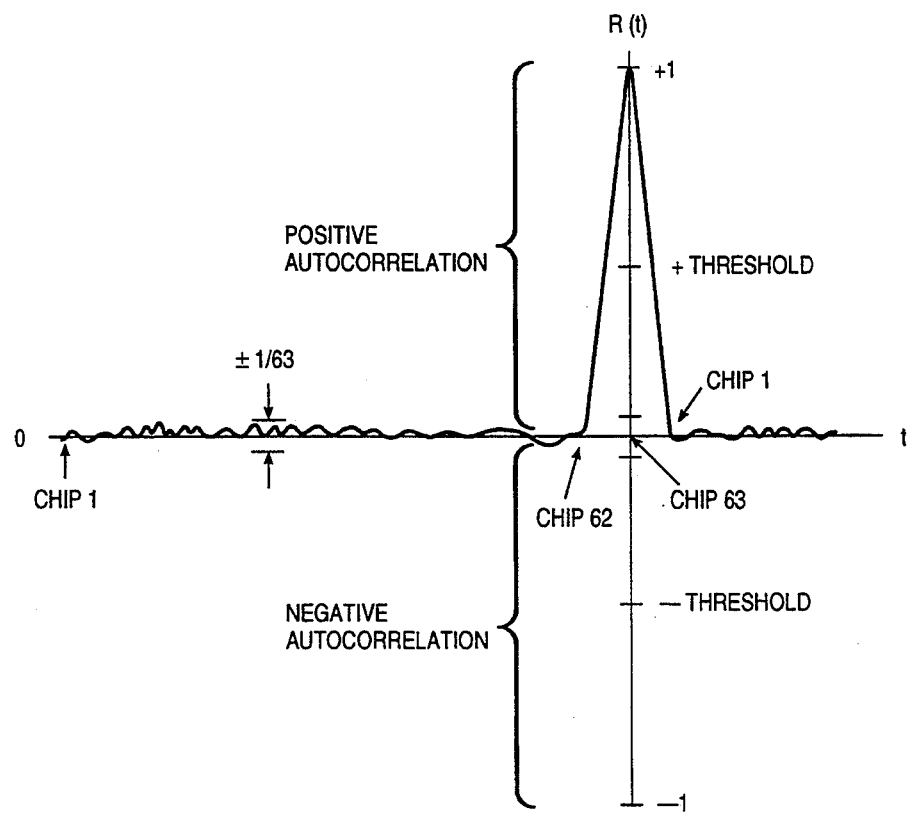
FIG_6
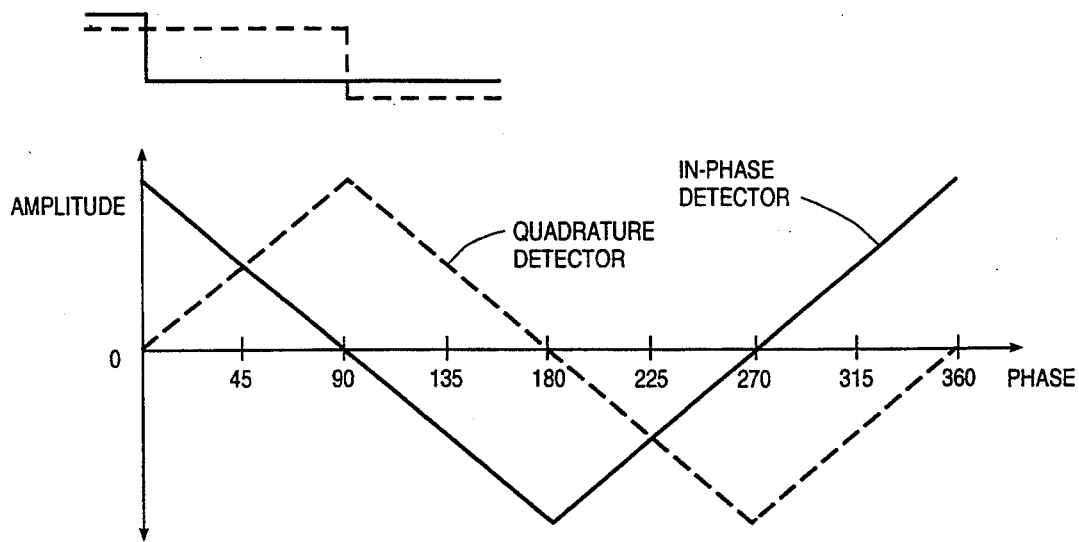

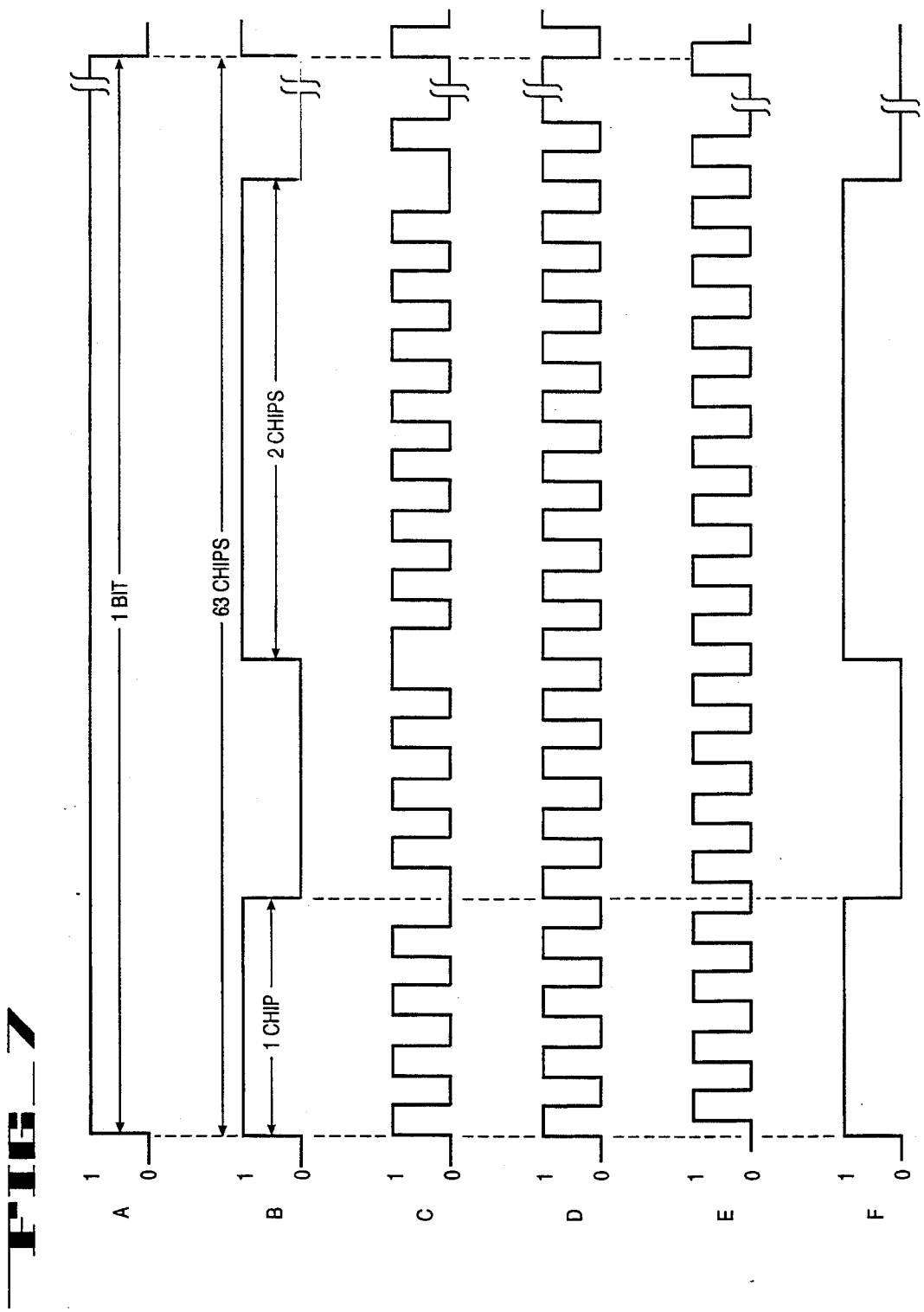

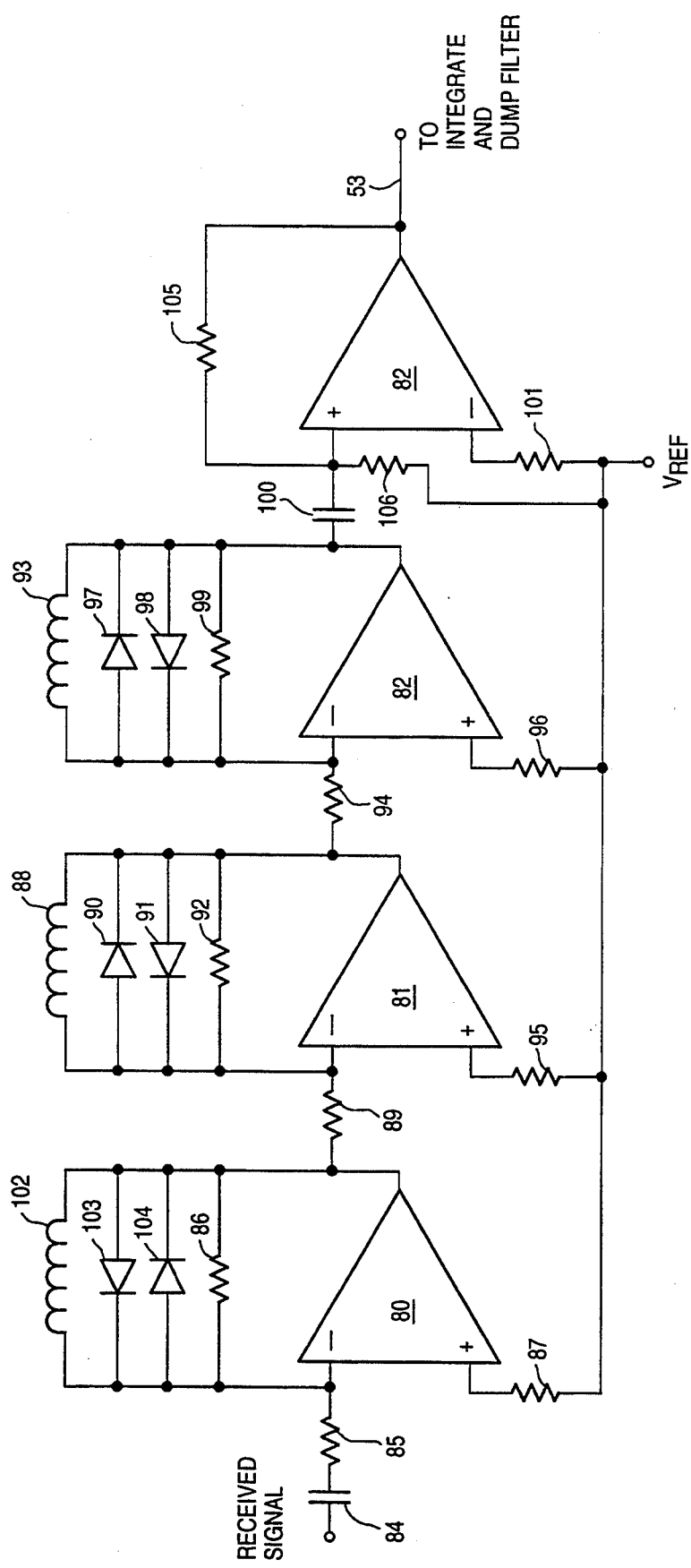
FIG_X

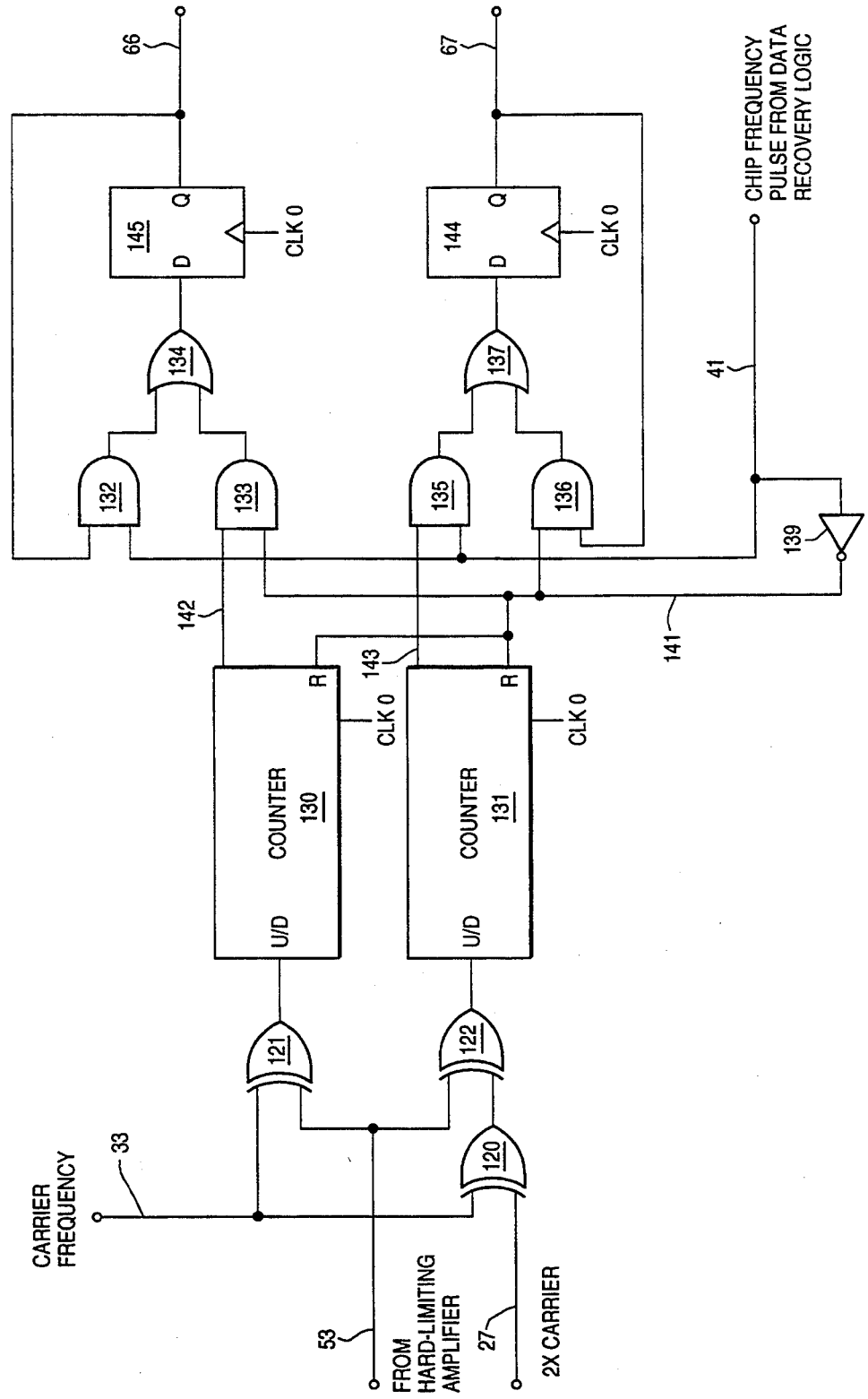

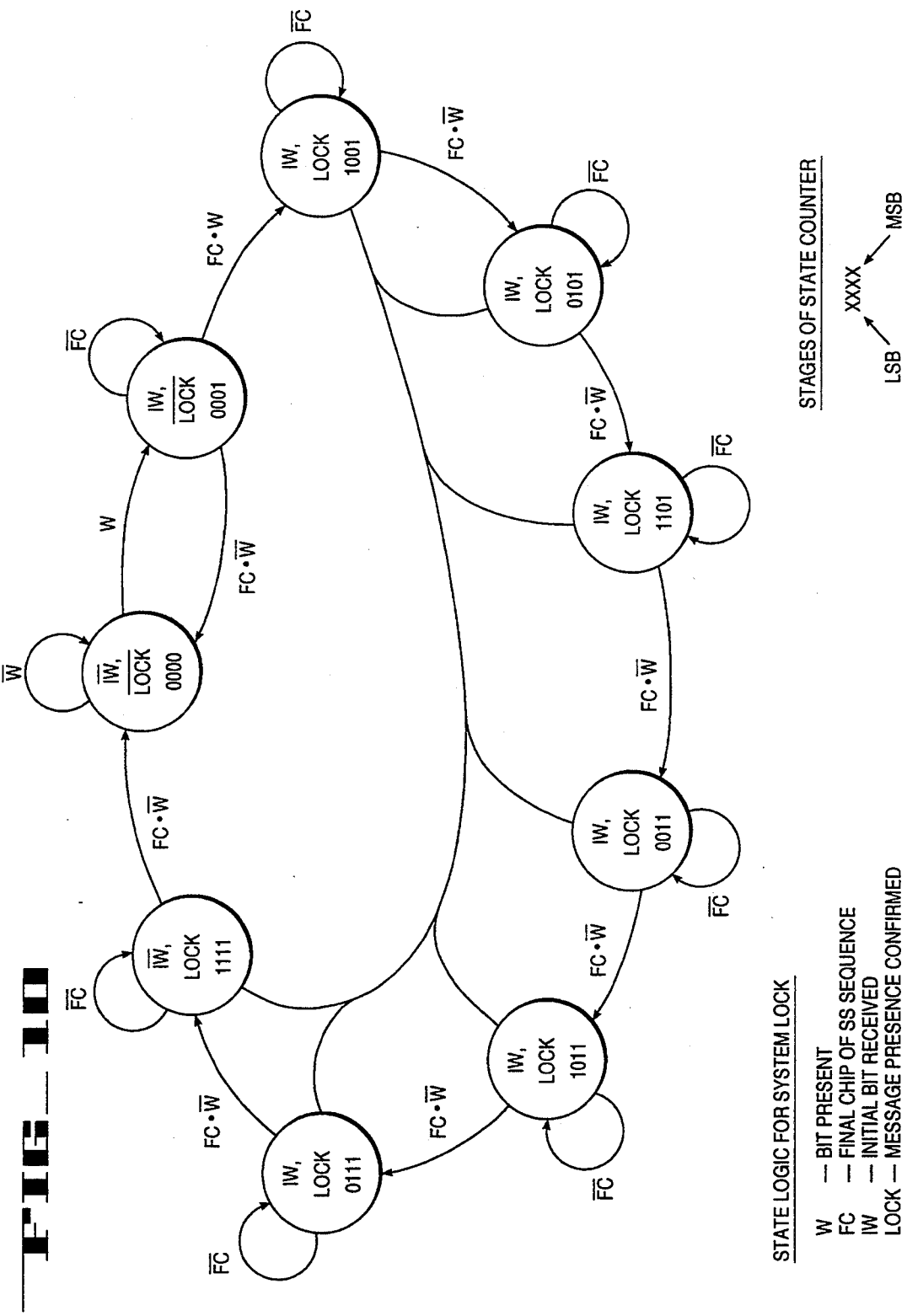

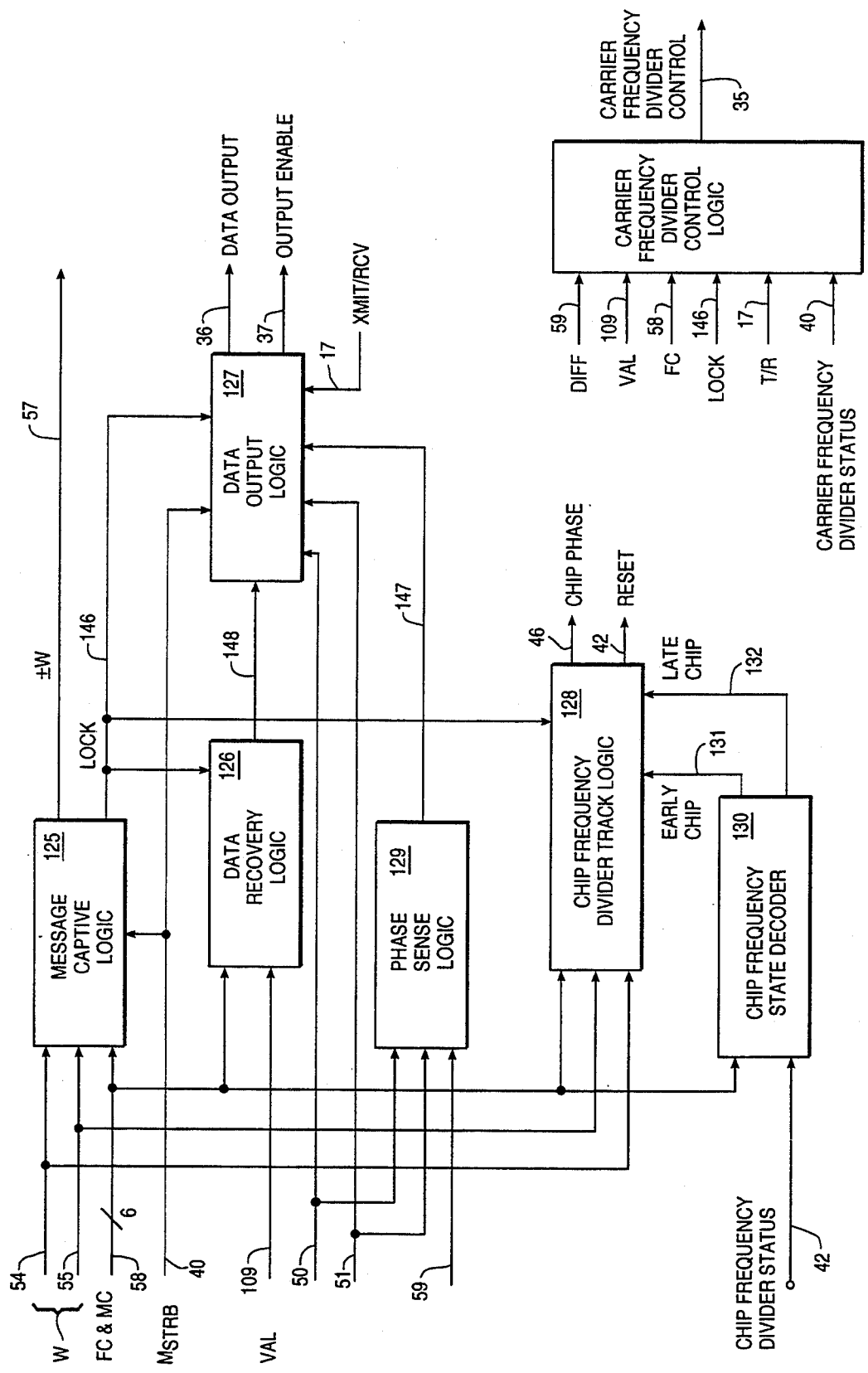

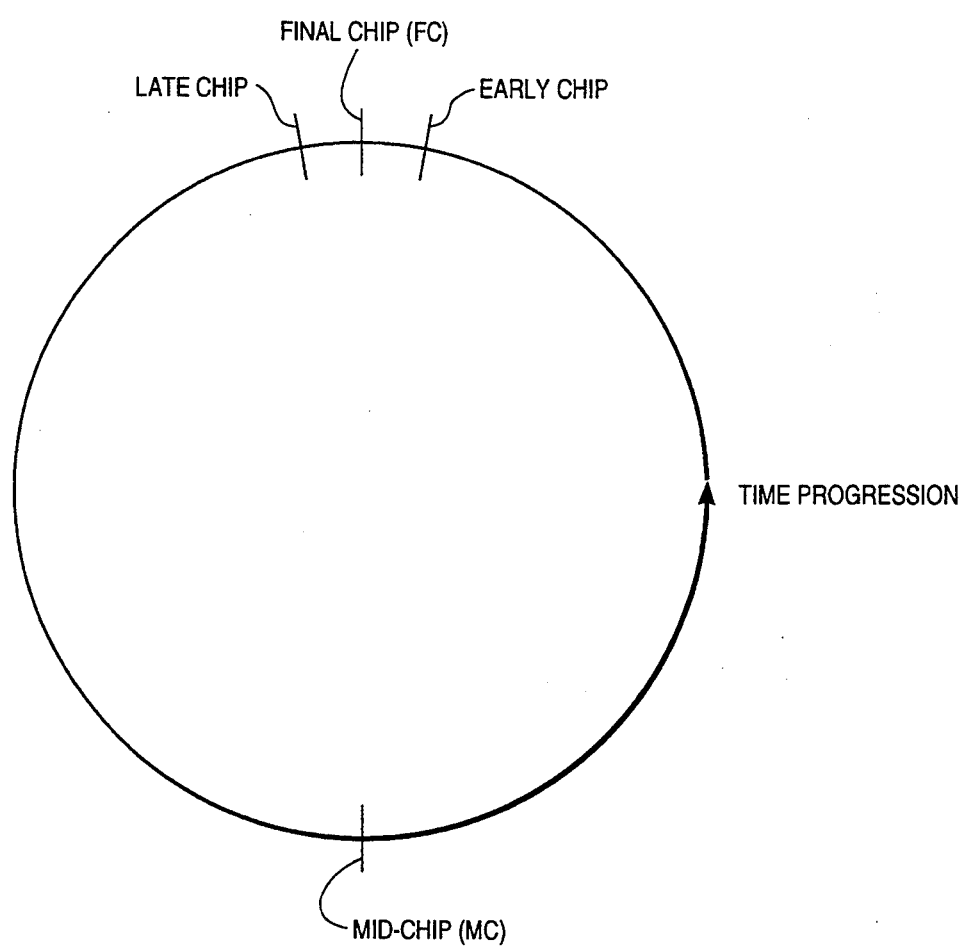

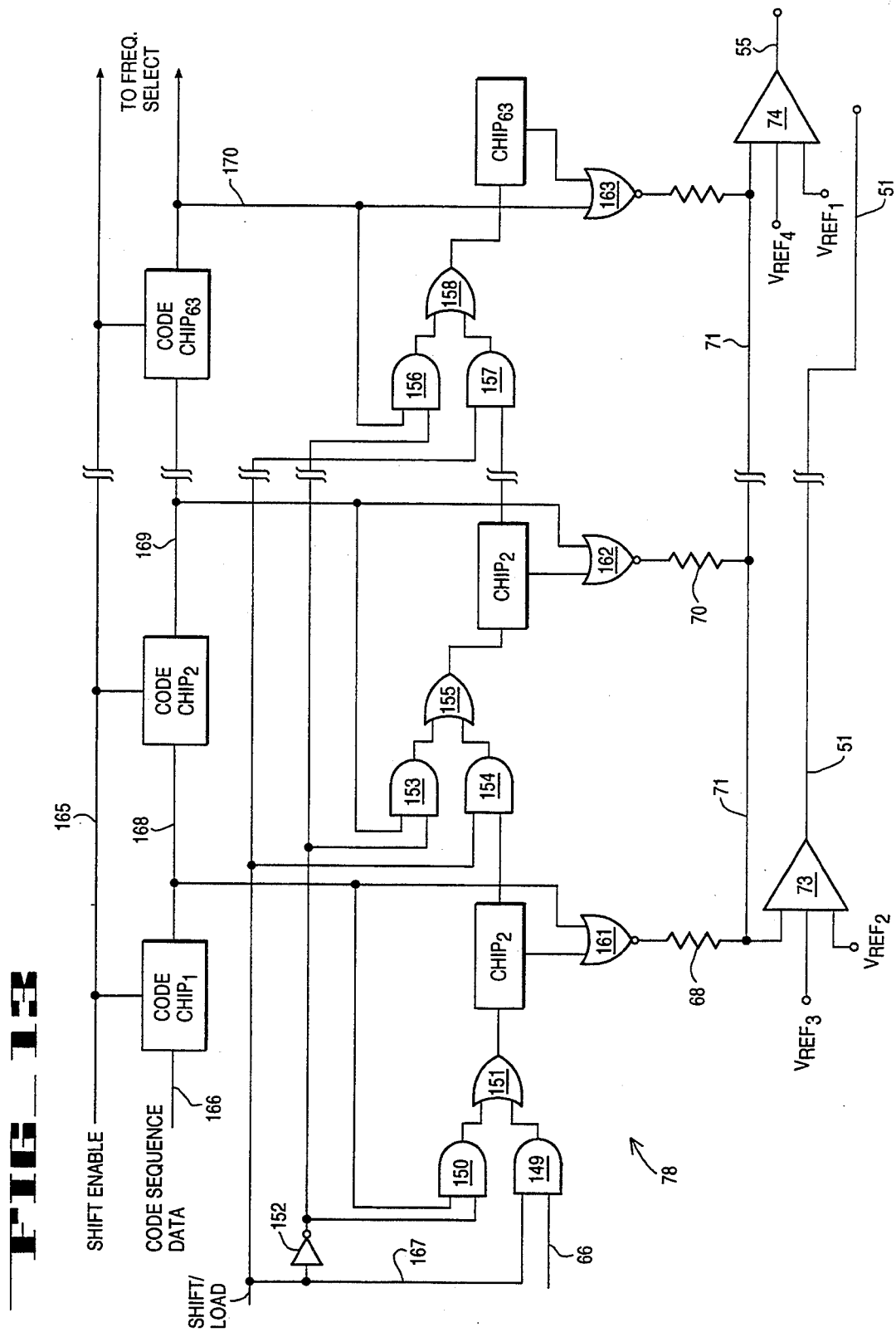

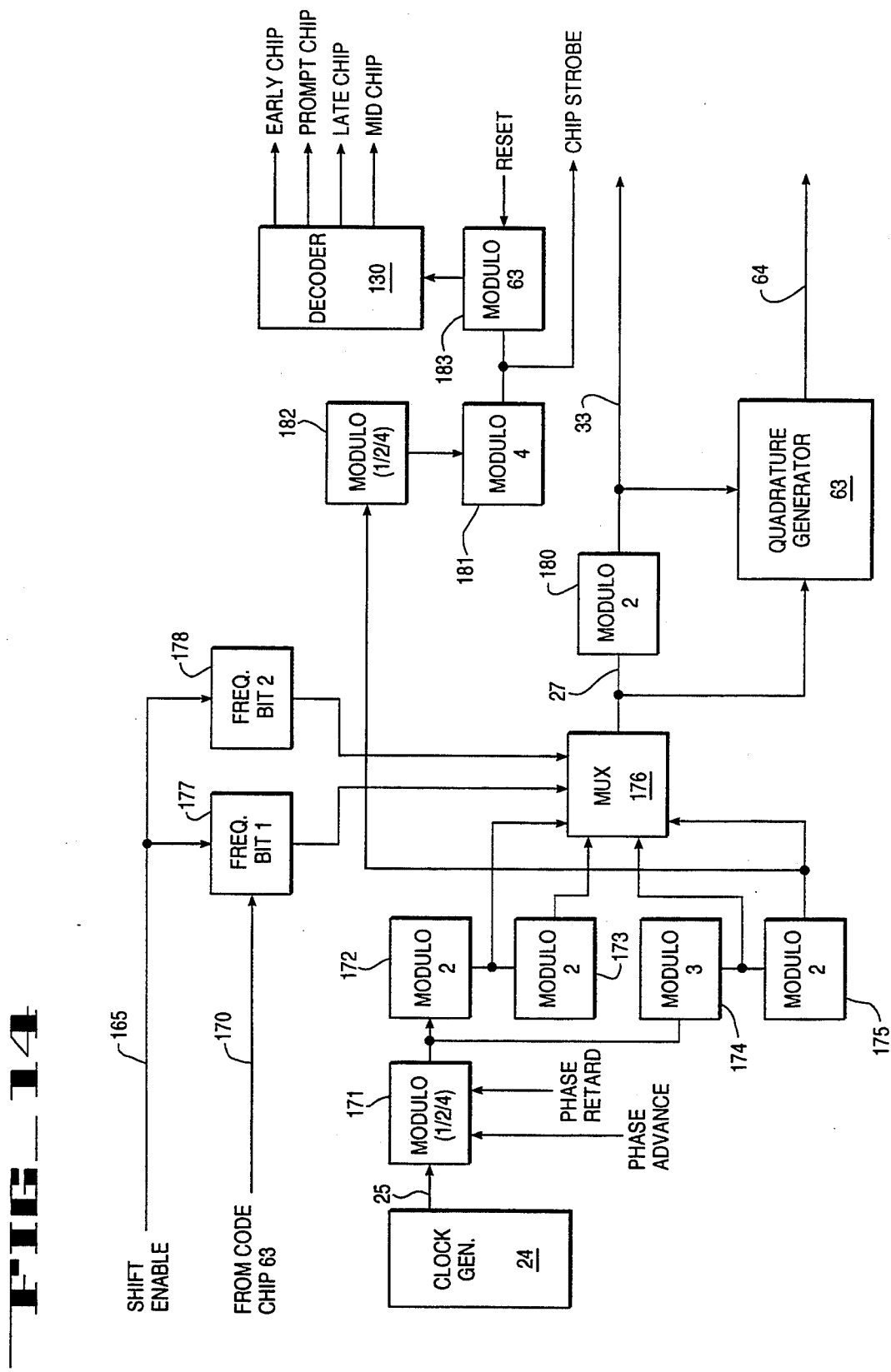

FIG_15
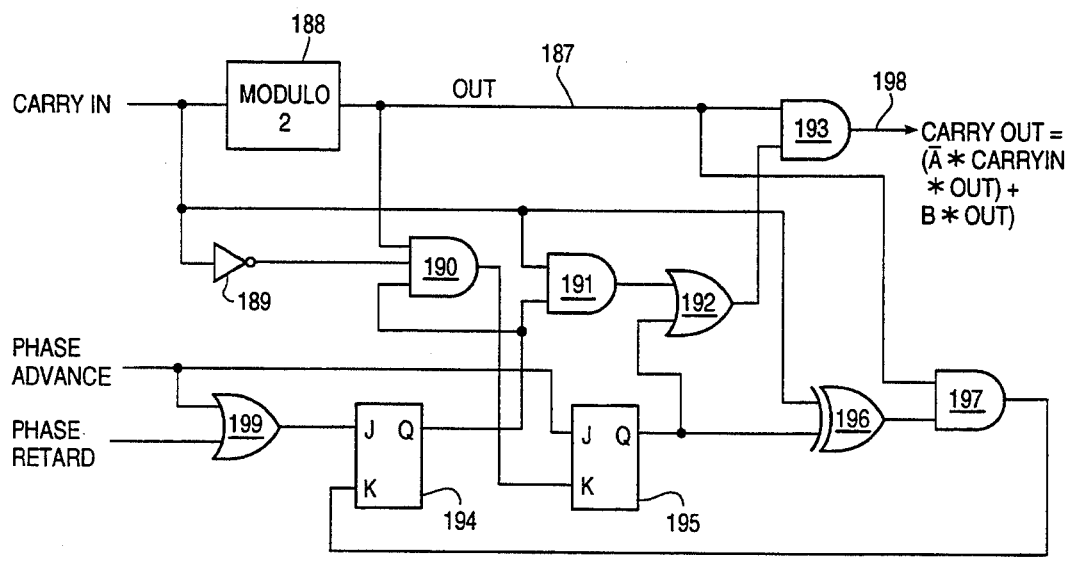
FIG_16
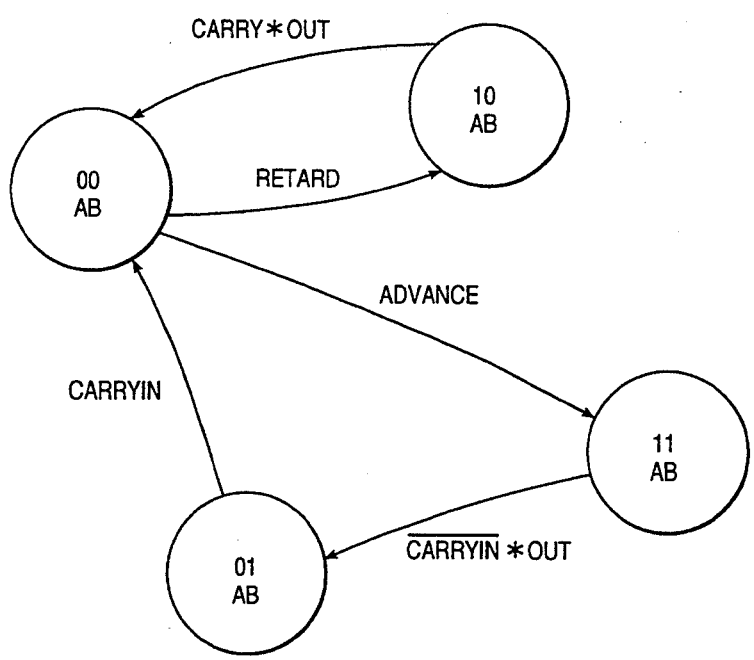

TRANSCEIVER PROVIDING SELECTABLE FREQUENCIES AND SPREADING SEQUENCES

CROSS-REFERENCE TO RELATED APPLICATIONS

This is a continuation of Ser. No. 07/830,121, filed Jan. 30, 1992, now U.S. Pat. No. 5,189,683, which is a continuation of application Ser. No. 07/684,038, filed Apr. 11, 1991, now U.S. Pat. No. 5,146,471, which is a continuation-in-part of Ser. No. 07/328,058, filed Mar. 23, 1989, now U.S. Pat. No. 4,979,183.

FIELD OF THE INVENTION

The present invention relates to the field of spread spectrum communications systems, particularly where such systems are utilized for communicating between intelligent cells in a network providing sensing, control and communications.

BACKGROUND OF THE INVENTION

There are a number of commercially available products which provide sensing, control and communications in a network environment. These products range from elaborate systems having a large amount of intelligence to simple systems having little intelligence. By way of example, such a system may provide control between a light switch and a light. When the light switch is operated, a digital code pattern is transmitted by one cell over power lines or free space and is received by another cell at the light. When the code is received, it is interpreted and subsequently used to control the light. Such a system, comprising a network of intelligent cells in which the cells communicate, control and sense information, is described in a pending U.S. patent application entitled, "Network and Intelligent Cell for Providing Sensing, Bidirectional Communications and Control", Ser. No. 119,330, filed Nov. 10, 1987, which application is assigned to the assignee of the present invention.

The transmitting and receiving of digital data is normally handled by a series of transceivers each of which is connected to an individual cell of a network. These transceivers may communicate with one another in numerous different ways over countless media and at any baud rate. They may, for example, each transmit and receive radio frequency (RF) or microwave frequency signals through antennas. The transceivers could be connected to communications lines, such as an ordinary twisted pair or fiber optic cable and thus communicate with one another independent of the power lines. Other known communication media may be employed between the transceivers such as infrared or ultrasonic transmissions. Typical transmission rates are 10K bits per second (KBPS) for power lines. Much higher transmission rates are possible for radio frequency, infrared, twisted pairs, fiber optic links and other media.

Power lines and RF are among the noisiest and crowded communications media available. The home or indoor office environment, where intelligent networks are typically located, is especially hostile to power line and RF communication, presenting problems of multi-path fading and multi-user interference. For reliable operation in these environments it is necessary that the communications system resist external interference, operate with a low-energy density and provide multiple-access capability without external control. In other applications, it may even be necessary to prevent unauthorized receivers from observing the messages. Spread spectrum communication techniques offer one solution to these aggravating problems.

Spread spectrum provide a means for communicating by purposely spreading the spectrum of the communications signal well beyond the bandwidth of the unspread signal. Motivation for using spread spectrum signals is based on the following facts: (1) These systems have the ability to reject unintentional jamming by interfering signals so that information can be communicated; (2) Spread spectrum signals minimize interference with competing users since the power transmitted wave is spread over a large bandwidth of frequency extent; (3) Since these signals cannot be readily demodulated without knowing the code and its precise timing, message privacy is attained; (4) The wide bandwidth of the spread spectrum signals provides tolerance to multi-path, i.e., reflected waves take longer to arrive at the receiver than the direct desired signal; and (5) Multiple access or the ability to send many independent signals over the same frequency band is possible using spread spectrum techniques.

Systems employing spread spectrum methods to communicate in a secure and non-interfering manner are well-known in the art. They include such systems as the space shuttle, the tracking and relay satellite system, Milstar and numerous military communications systems. Many of these systems use a frequency-hopping technique similar to that described in U.S. Pat. No. 4,222,115 of Cooper et al. One of the drawbacks, however, in using spread spectrum communication techniques is that they often require elaborate, complex and expensive circuitry. Certain types of spread spectrum systems, such as direct sequence spread spectrum, also suffer from prohibitively long acquisition and decoding times. Since a direct sequence spread spectrum receiver does not readily distinguish between signal and noise, and, in particular, since the incoming signal is a data modulated carrier that is spread by a pseudonoise sequence, synchronization between the transmitter and receiver is often troublesome.

Many attempts have been made to overcome these shortcomings. For instance, U.S. Pat. No. 4,653,076 of Jerrim et al., teaches synchronizing the receiver and transmitter to a common 60 Hz power line. Jerrim et al., also suggests the use of a master/slave arrangement wherein the transmitter may act to produce a master timing signal that is sent along with the data to the receiver (e.g. slave).

In another approach, U.S. Pat. No. 4,351,064 of Ewanus uses a tracking reference oscillator which superimposes a timing signal onto the carrier to maintain synchronization. Alternatively, U.S. Pat. No. 4,481,640 of Chow teaches splitting a serial digital input signal into odd and even bit data streams, each encoded with its own synchronous bit timing. U.S. Pat. No. 4,672,658 of Kavehrad et al., discloses a direct sequence spread spectrum system using a first separate unique chip sequence pattern for information communication and a second common chip sequence pattern for call-setup in a wireless PBX network.

Other more radical configurations have also been tried. For example, U.S. Pat. No. 4,759,034 of Nagazumi discloses a system using at least two pseudonoise generators for producing two separate pseudonoise signals having a predetermined relationship. U.S.

Pat. No. 4,703,474 of Foschini et al. teaches a method of synchronization in which the user first communicates synchronization information using a narrowband signal prior to transmission of the actual spread spectrum data.

Each of the above-mentioned spread spectrum approaches still suffer to a large extent, from excessive cost and complexity. Therefore, what is needed is a simple spread spectrum communications system which is useful for transmitting and receiving data in a network of intelligent cells which provide sensing, control and communications. In addition, the system should minimize interference with competing users allowing multiple access over the same frequency band.

As will be seen, the present invention provides a simple, low-cost means of providing spread spectrum communication which is ideally suited for use in a distributed network environment. The system of the present invention employs a direct sequence spread spectrum technique which is characterized by rapid acquisition and decoding of a transmitted message and high immunity from interfering signals. In addition, means are provided for separating channels by using selectable frequencies and selectable spreading sequences to provide for multiple communications channels on a single transmission medium.

SUMMARY OF THE INVENTION

A transceiver for transmitting and receiving digital data in a network environment is described. The transceiver includes both transmitter and receiver sections. The transmitter section is used for encoding a digital bit stream to a direct sequence spread spectrum signal. The direct sequence spread spectrum signal is then transmitted to another transceiver within the network. Specifically, the transmitter of the present invention locks the digital bit stream, a predetermined spread spectrum chip sequence and a carrier signal using binary phase shift keying modulation techniques. The frequency of the carrier signal, chip sequence and the bit stream are all derived from, and integrally related to, an accurate reference frequency. The reference frequency is produced by a crystal oscillator circuit. By deriving and relating the encoding signals in this manner, the receiver section of the transceiver can rapidly acquire and decode the transmitted signal.

The transceiver also includes circuit means for modifying the pseudonoise chip sequence to provide selectable spreading sequences for multiple communications channels on a single transmission medium. Additional means for providing selectable carrier frequencies may also be incorporated into the transceiver in an alternative embodiment.

The receiver portion of the transceiver includes an integrate and dump filter having in-phase and quadrature phase detector circuits. The outputs of each of these phase detector circuits are coupled to a linear correlator for despreading of the chip sequence and recovery of the digital data stream.

BRIEF DESCRIPTION OF THE DRAWINGS

The present invention will be understood more fully from the detailed description given below and from the accompanying drawings of the preferred embodiment of the invention, which, however, should not be taken to limit the invention to the specific embodiment but are for explanation and understanding only.

FIG. 1 illustrates a typical application of the transceiver of the present invention within a communications network having distributed intelligence.

FIG. 2 is a block diagram representation of the transceiver of the present invention.

FIG. 3 illustrates the binary phase shift keying modulator of the present invention. The modulator of FIG. 3 is designed for direct sequence spread spectrum transmission over power lines.

FIG. 4 shows the details of integrate and dump filter 36 and correlator 37 in block diagram form.

FIG. 5 depicts a sample autocorrelation function response of a demodulated receive signal and a locally generated PN code replica.

FIG. 6 illustrates the amplitude response versus phase relationship of the in-phase and quadrature phase detectors which comprise the integrate and dump filter of the present invention.

FIG. 7 is a portion of a sample timing diagram illustrating the encoding and decoding relationships between the various component signals of the direct sequence spread spectrum signal. The capital letters denote the corresponding nodes in FIG. 2 where each signal is produced.

FIG. 8 is a circuit schematic of the bandpass filter and hard-limiting amplifier of a preferred embodiment of the present invention.

FIG. 9 is a logic diagram showing the integrate and dump filter of the currently preferred embodiment of the present invention.

FIG. 10 is a state diagram illustrating the system lock characteristics of the present invention.

FIG. 11 is a block diagram of a portion of the track logic and data recovery unit of the present invention.

FIG. 12 illustrates the time progression relationship of the late chip and early chip to the final chip and mid-chip.

FIG. 13 illustrates an improved correlator which provides means for modifying the spreading sequence.

FIG. 14 show a functional block diagram of the carrier and chip counters needed to provide for multiple frequency operation.

FIG. 15 is the currently preferred embodiment of the 3-modulo (1/2/4 modulo) counter stage of FIG. 14.

FIG. 16 is a state diagram of the counter of FIG. 15.

DETAILED DESCRIPTION OF THE PRESENT INVENTION

A transceiver employing direct sequence spread spectrum techniques is described. The transceiver contains a transmitter section for encoding a binary bit stream onto a direct sequence spread spectrum signal, and a receiver section for acquiring and decoding a transmitted signal. The transceiver is particularly well-suited for communicating information in a network environment in which it is necessary to reject broadband interference in a transmission media accommodating many independent users.

In the following description, numerous specific details are set forth, such as specific chip codes, frequencies, etc., in order to provide a thorough understanding of the present invention. It will be obvious, however, to one skilled in the art that these details are not required to practice the invention. In other instances, well-known circuits, methods and the like are set forth in block diagram form in order not to unnecessarily obscure the present invention.

I. Overview of the Communications System of the Present Invention

Before describing the present invention in detail, an understanding of the direct sequence spread spectrum (DS/SS) communication technique embodied in the present invention will aid in appreciation of the details to follow.

Direct sequence modulation is characterized by phase modulating a sine wave or pulse train by an unending string of pseudorandom or pseudonoise (PN) code chips. This unending string is typically based on a pseudonoise code itself consisting of an apparently random sequence of code chips that repeats every pseudonoise code period. A pseudonoise code modulated signal to be transmitted can be characterized by the equation below.

$$S(t) = \sqrt{\frac{2P}{Z^2}} \times PN(t) \, D(t) \cos(\omega t + \Theta)$$

Where P is the transmitted power, PN(t) represents the spectrum spreading pseudonoise code. D(t) is the data sequence which is unknown to the receiver and contains the information to be communicated bit by bit. Omega ($\omega$) is the radian frequency and theta ($\Theta$) is the phase.

Both the data and the pseudonoise code are multiplied by the carrier, $\cos(\omega + \Theta)$. This modulation method is called phase shift keying. Alternatively, a binary pulse train having radian frequency $\omega$ and phase $\Theta$ can be used as the carrier instead of a sinusoidal waveform, in which case the modulation method is called binary phase shift keying (BPSK). If $T_b$ represents the duration of a bit, then typically the duration of a pseudonoise code chip $T_c$ is much smaller than $T_b$ so that many chips occur during one bit. Both data, D(t), and the pseudonoise code phase modulate the carrier by 0° or 180° according to whether PN(t)×D(t) is +1 or -1.

For the receiver to function, it must align the received pseudonoise code to the local PN generator timing. This is accomplished in two distinct steps: acquisition and tracking. Acquisition is the searching phase where the receive signal is demodulated to remove the carrier signal. Since the carrier signal for both the receiver and transmitter sections of the transceiver are derived from a common reference frequency, the received signal and the locally generated carrier have about the same frequency. Phase alignment is achieved by utilizing a dual phase detector approach, each phase detector being offset from one another by 90°.

Once the carrier signal is removed from the received (i.e., demodulation) signal, the decoding process begins. Decoding involves correlating the demodulated received signal with the locally generated chip code. When code alignment is close the correlator later output becomes large. Positive correlation corresponds to a positive, or "1", data bit while negative correlation corresponds to a negative, or "0", data bit. A bit synchronizer provides bit timing for the data bit sequence thereby determining whether positive unit bit pulse or a negative bit pulse was transmitted. This bit sequence determines the message being sent. (This discussion is somewhat oversimplified since the reconstructed PN code is never perfectly aligned with the receive code and the locally generated carrier likewise is not exactly in phase with the received carrier).

It should be obvious that the five attributes of spread spectrum systems discussed above apply in this direct sequence pseudonoise spectrum system. Suppose an unmodulated tone of the carrier frequency is present in the receiver along with the spread signal of the above equation. Then, in the pseudonoise code a spreading process, the undesired tone is multiplied by the local pseudonoise code thereby spreading its spectrum to a bandwidth $2/T_c$. However, the received signal is collapsed to a bandwidth of $2/T_b$ so that the data detector only sees a small fraction of the original tone energy. By making the processing gain ($=T_b/T_c$) much greater than 1, the efficiency of the DS/SS system of the present invention in rejecting unwanted interference is enhanced. The currently preferred embodiment of the present invention has a processing gain of 63 (this number actually represents a design choice which, in many cases, is governed by FCC regulations and system requirements).

II. Discussion of the Currently Preferred Embodiment

Referring to FIG. 1, a typical application of the transceiver of the present invention within a communications network is shown. The communications network contains a plurality of intelligent neuron cells. The neuron cells, in general, being programmable single chip remote control, sensing and communication devices that—when interconnected (via various transceivers) with other neuron cells—have distributed sensing, communication, control and network configuration intelligence, configuration and control.

Groups of neuron cells within each network perform particular functions. Some cells, by way of example, may provide control between a light switch and a light. When the light switch is operated, neuron cell 21 provides a digital code along data line 22 to transceiver 20. Neuron cell 21 also provides a transmit and receive signal (as shown by the label XMIT/RCV in FIG. 1) along line 23. Transceiver 20 also receives a reference frequency input along line 25 from crystal resonator 24. This reference frequency is used by transceiver 20 to generate the carrier frequency which is used for transmission of data.

Within a given network, the reference frequency will always be approximately the same since identically specified crystals will be used from transceiver to transceiver. This means that the carrier frequency produced between any two given transceivers within the network will always be very nearly the same (discounting small deviations within the tolerance specifications of the crystals). A standardized carrier frequency obviates the need for complicated schemes and circuitry ordinarily used by receivers to detect receive signal frequency, Because a search over a broad range of frequencies is not required, the receiver portion of the present invention can quickly acquire and decode the receive signal.

Once transceiver 20 receives the digital message from neuron cell 21, it encodes the message and transmits the coded pattern along line 26 which is coupled to a transmission media—in this case a power line—using an appropriate coupling network. If the power line is comprised of more than two wires, any two wires from the set of wires may be used, but the same two wires from the set should be used for all transceivers expected to mutually communicate, unless bridging networks are installed to transfer the signal swiftly among wires. In some instances, noise, safety consideration, or impedance levels may cause a particular pair to be preferred. The coupling network shown in FIG. 1 consists of a transformer and AC coupling capacitors C1 and C2. When operating in the receive mode, transceiver 20 receives coded data along line 26. Transceiver 20 then acquires and decodes the received signal, providing the digital bit stream message to neuron cell 21 along data path 22.

The transceivers may communicate with one another in numerous different ways over countless media at any baud rate. They may, for example, each transmit and receive radio frequency or microwave frequency signals through antennas. The transceivers could also be connected to communications lines, such as an ordinary twisted pair or fiber optic cable and thus communicate with one another independent of a power line.

FIG. 1 illustrates one application which utilizes a power line transmission media and a transformer coupling scheme. The components C1 and C2 provide some tuning for the carrier current waveform. Certain specific power line applications may be arranged differently. Other known communications media may also be employed between the transceivers—such as infrared or ultrasonic transmissions. Typical transmission rates are 10K-bits per second (KBPS) for power lines. Much higher transmission rates are possible for radio frequency, infrared, twisted pairs, fiber optic links and other media.

FIG. 2 shows a block diagram of the transceiver of the present invention. Ordinarily, all of the component sections of transceiver 20 are integrated in a single semiconductor circuit. The resonator for clock generator 24 and the coupling network is provided to transceiver 20 as discrete elements, normally incorporated on a printed circuit board and mounted adjacent to the transceiver integrated circuit. The resonator for clock generator 24 comprises a commercial quartz crystal that resonates at a characteristic frequency which preferably ranges anywhere between 10 to 50 megahertz and is distributed to logic elements as required to establish synchronous transitions of sequential logic. Currently, the present invention utilizes a 20 MHz quartz crystal. Circuit 24 provides an accurate and stable reference frequency to carrier frequency divider 32 and chip frequency divider 30 along line 25.

As manufactured, quartz crystal have a very high degree of accuracy, usually deviating no more than 0.02% from their characteristic frequency. A very tight crystal tolerance means that the reference frequency will be approximately identical for various transceivers across a network. A stable, accurate reference frequency also provides a means for the receiver portion of transceiver 20 to acquire and lock onto a receive signal without having to hunt for the signal across various frequency bands. In other words, rapid acquisition and demodulation of the received direct sequence spread spectrum signal can be achieved since the receiver already is provided with the frequency of the transmitted signal. Furthermore, assuming that all transceivers within a network are subject to the same environmental conditions (i.e., temperature, humidity, noise, etc.,), frequency deviations caused by these conditions will track each other for each of the crystals associated with the transceivers. Thus, a narrow tolerance on the reference frequency is one reason that the present invention is characterized by a rapid capture time.

Carrier frequency divider 32 is used to generate the carrier signal which attaches to the information during the process of modulation. As shown in Figure, carrier frequency divider 32 comprises a binary counter which is clocked by the reference frequency along line 25. In this arrangement, the carrier is derived directly and integrally from the crystal reference. The carrier frequency is output onto line 33 which is coupled to binary phase shift keying (BPSK) modulator 29, quadrature generator 63 and inphase detector 61. The carrier signal is also provided to track logic and data recovery unit 38 along line 40. Twice the carrier frequency is coupled on line 27 to quadrature generator 63 for developing a quadrature signal for the integrate and dump filter of the receiver portion of transceiver 20.

Clock generator 24 also provides a reference frequency to chip frequency divider 30, also comprising a binary counter, for developing the appropriate clock on line 31 for PN generator 39. Thus, PN generator 39 produces a chip sequence which is integrally derived from and integrally related to the crystal reference.

For transmission along power lines, the carrier frequency of the currently preferred embodiment is approximately 2.5 megahertz and the crystal resonator reference frequency is approximately 20 megahertz. The chips are generated at a rate of 4 carrier cycles per chip. By having a crystal which oscillates at a frequency 8 times greater than that of the carrier, additional pulses may be added to divider 32 during the receive mode process in which data is synchronized to the pseudo-noise chip sequence. Higher frequency signals are also used for certain timing relationships within the integrate and dump filter, as will be discussed below. Bit synchronization is provided by data recovery unit 38. This aspect of the invention will also be discussed in more detail later.

Data is provided to transceiver 20 along line 60, which is shown in FIG. 2 being coupled to BPSK modulator 29. The data is shown as being synchronous with the PN generator. Alternatively, a data FIFO may be used to store the data as it is provided to the transceiver. For this configuration an extra clock signal would be provided to load the data bit stream of the binary message to be encoded. The size of the FIFO would be determined by the maximum discrepancy which might occur between the data rate on line 60 and the PN pattern rate. If the discrepancy is large, the FIFO must be made large enough so as to insure a steady stream of data to modulator 29 without interruption or vacancies. If the data rate is not guaranteed to excede the PN rate, the user would normally load the FIFO with the binary message until it is one-half full prior to the time transmission begins. Thus, when configured with a FIFO, the present invention synchronizes the bit stream to the PN generator in an integral relationship. In the currently preferred embodiment of FIG. 2, i.e., shown without a FIFO, synchronization is provided by neuron 21.

As previously mentioned, divider 32 also provides a separate carrier signal along line 33 to in-phase detector 61 of the integrate and dump filter portion of the receiver. This carrier signal is used during the demodulation process wherein the received DS/SS signal is multiplied by the carrier. Also connected to carrier frequency divider 32 is line 35 produced by track logic and data recovery unit 38. During tracking, the track logic portion of unit 38 produces a signal on line 35 which alters the phase of divider 32 to maintain precise alignment of the receive signal and the carrier.

FIG. 2 also illustrates transmit/receive (XMIT/RCV) signal 17 coupled to unit 38 and power amplifier 28. The transmit/receive signal is provided by the associated neuron cell and indicates to the transceiver what mode to operate in; either as a transmitter or a receiver. For example, if the transceiver is to operate in receive mode, then power amplifier 28 will be deactivated by line 17; setting it to a high impedance state. Carrier divider 32 will then produce a carrier clock pulse signal (which is identical in frequency to that of the transmitted carrier) to the receiver portion of transceiver 20. XMIT/RCV signal is also coupled to unit 38 to control buffer 18 after acquisition. Buffer 18 is connected to line 60 to similarly control the flow of information along these lines during transmit and receive cycles.

In the receive mode, divider 32 accepts phase adjustment signals along line 35 from track logic and data recovery unit 38. If a phase error is detected between the received DS/SS signal and the local carrier phase, data recovery unit 38 sends an appropriate signal along line 35 to carrier generator 32 instructing it to either skip or add pulses to the pulse train. This technique is commonly referred to as "pulse stuffing" and insures that the carrier is in alignment with the received DS/SS signal.

FIG. 2 also shows pseudonoise generator 39 receiving a clock input along line 31. Pseudonoise generator 39 uses the integrally divided reference signal to derive a PN code, also referred to as a PN sequence. In the currently preferred embodiment, four carrier pulses comprise a single chip—a chip being the smallest time increment in the PN sequence. The total bit time period consists of the chip duration times the number of chips per sequence—which in the case of the currently preferred embodiment is 63 time chips long. The PN chip sequence produced is periodic in that it repeats itself after some period of time.

The output of generator 39 appears on line 43 as a steady stream of pseudorandom chips; the duration of each chip being much shorter than the bit time. The chip sequence is also provided to data recovery unit 38 along line 58 to be used in data recovery and bit synchronization. (The terms direct sequence and pseudonoise are used interchangeably within this application and no distinction is made between them.) Optimally, pseudonoise generator 39 comprises a maximal-length shift register having very desirable autocorrelation properties. A sample PN code, which may be taken from any stage of the shift register, is provided in appendix I.

One of the key aspects of the present invention is that the PN chip sequence produced by generator 39, as well as the carrier clock produced by divider 32, are derived from, and integrally related to, the clock reference produced by generator 24. As is currently implemented in the present embodiment, there are four carrier pulses produced for each chip and 63 chips in a chip sequence for each bit of the data stream. Of course, the number of chips in a chip sequence may vary according to the level of interference rejection desired. Having more chips for each bit increases the rejection of unwanted interference and increases the level of privacy of the communication.

Similarly, the number of carrier pulses produced for each chip may range anywhere from one to several hundred. However, there are certain advantages in making chip duration equal to a small integer number of carrier pulses (e.g., less than 10). In integrally relating the chip sequence and the carrier signal the two signals are said to be "locked". Locking of the carrier signal to the chip sequence, and also to the data bits, helps to reduce total capture time of the transmitted signal when the transceiver is operating in the receive mode. Where the constituent signals of the DS/SS transmission are not integrally related derivatives of the crystal frequency the receiver must go through arduously complex acquisition and decoding operations. Locking also results in an improved signal-to-noise ratio.

Other spread spectrum communications systems which rely on covert communications typically use very long chip sequences that are non-integrally related to the carrier in order to prevent intrusion upon their signal. By making the chips, the carrier and the bits mutually integrally related, acquisition and decoding times are decreased since only one timing derivation needs to be performed.

BPSK modulator 29 performs the modulation of the data with the carrier signal and with the pseudonoise sequence of chips. For power line transmissions, modulator 29 can be implemented using a pair of EXCLUSIVE-OR gates 48 and 49 as shown in FIG. 3. The EXCLUSIVE-OR gate has the property such that when one input is true, the output produced is the inverse of the other input. Therefore, if the data bit on line 60 is a "1", or true, then the output of EXCLUSIVE-OR gate 49 will simply be the inversion of the chip sequence present on line 43. On the other hand, if the data bit present on line 60 is a "0", or false, then the chip sequence on line 43 will be unaltered and pass through EXCLUSIVE-OR gate 49 to appear on line 45. At this point, the encoded data present on line 45 is said to be direct sequence spread. EXCLUSIVE-OR gate 48 subsequently modulates the spread signal on line 45 with the carrier signal provided on line 33. The resulting DS/SS signal is produced on line 44 which is coupled to the input of power amplifier 28.

The relative relationships of the data bit stream, the chip sequence and the modulated DS/SS signal are shown in the timing waveform of FIG. 7. Waveform A of FIG. 7 represents a single bit of data, while waveform B illustrates one portion of a possible chip sequence. Capital letters A and B are also labelled on lines 60 and 43, respectively, of FIG. 2. Waveform C, labelled on line 44 of FIG. 2, represents the DS/SS signal generated using a carrier running at 4 times the chip rate.

Power amplifier 28 may have a variety of embodiments depending on the nature of the transmission media. For instance, it may simply consist of a series of ordinary logic devices having output characteristics which enable the transmission of the DS/SS signal along ordinary power lines. Of course, where other transmission media are used (e.g., RF, or microwaves) power amplifier 28 and BPSK modulator 29 must comprise circuitry that is capable of operating and transmitting at elevated frequencies. Power amplifier 28 is connected to coupling network 34 via line 26. Network 34 acts as a transmission interlace between the transceiver and the transmission media. During a receive cycle, the receive signal is provided to amplifier 52 on line 26.

Referring again to FIG. 2, the receiver portion of transceiver 20 may now be described in more detail. Initially, the received DS/SS signal is delivered to limiting amplifier 52. Amplifier 52 includes a filter which is designed to eliminate spectral noise at both high and low frequencies. As shown in FIG. 8, limiting amplifier 52 of the currently preferred embodiment comprises an operational amplifier 80, with resistors 86 and 85 selected so as to provide about 20 dB gain. Capacitor 84 provides AC coupling with the received signal and functions to filter out low frequency noise. The feedback portion of opamp 80 also includes cross-coupled diodes 103 and 104 and inductor 102. The negative input of operational amplifier 80 is coupled to a voltage reference, $V_{ref}$, through resistor 87. Voltage $V_{ref}$ is established to be the midpoint voltage of the operational amplifier.

Limiting amplifier 52 also comprises a pair of operational amplifiers 81 and 82 with their associated circuit elements. The feedback path of amplifier 81 contains a parallel connection of resistor 92, diodes 91 and 90 and inductor 88. Amplifier 82 includes parallel feedback elements 99, 98, 97 and 93 (also comprising a resistor, two bi-directionally coupled diodes and an inductor). By way of example, a 1N6263 diode, or its equivalent, may be used in the embodiment of FIG. 2. These amplifiers are designed to limit the amplitude of the incoming DS/SS signal to a certain amplitude range as well as provide approximately 20 dB of gain in each stage. Amplifiers 81 and 82 are also referenced to voltage reference $V_{ref}$ through resistors 95 and 96, respectively. Amplifier 81 is coupled to amplifier 80 through resistor 89 and to amplifier 82 through resistor 94.

The output of amplifier 82 is coupled to voltage comparator 83 through AC coupling capacitor 100. The other input of voltage comparator 83 is coupled to $V_{ref}$ through resistor 101. Feedback and gain for comparator 83 are established via resistors 105 and 106. The output signal produced by comparator 83 on line 53 is generally a noise-free, digital DS/SS signal having uniform rise and fall times and a uniform amplitude. Ideally, if there is no additional noise present, the received signal on line 53 would closely correspond to the signal which was transmitted.

The output of limiting amplifier 52 is coupled via line 53 to the integrate and dump filter portion of the receiver, comprising inphase detector 61 and quad detector 62. Inphase detector 61 also receives a carrier clock signal along line 33. This clock signal has the same frequency as the carrier component of the transmitted DS/SS signal. Because the transmitted DS/SS signal is already in frequency synchronization with the local oscillator (i.e., carrier pulse train provided on line 33), the receiver only needs to phase align the incoming signal with the carrier for proper demodulation. Phase demodulation is one of the functions of detectors 61 and 62.

FIG. 4 shows the integrate and dump filter comprising an inphase detector 61, a quadrature detector 62 and a quadrature generator 63. Quadrature generator 63 receives as its inputs a carrier signal on line 33 and a signal at twice the carrier on line 27. Both of these signals are produced by carrier frequency divider 32. The output of generator 63 is a pulse train running at the carrier frequency but shifted by 90° relative to the signal on line 33. Generator 63 may be implemented in a variety of ways. The present invention simply uses an EXCLUSIVE-OR gate.

Each of the phase detectors 61 and 62 includes a counter which accumulates the phase demodulated signal of the received carrier. However, in the case of quad detector 62 the phase of the input carrier along line 64 is shifted by 90°. The clock waveforms associated with the inphase and quad detectors 61 and 62 are shown in FIG. 7 as waveforms D and E, respectively. Waveform C of FIG. 7 may represent the input DS/SS signal to limiting amplifier 52 along line 26.

During acquisition and decoding, the clock pulse trains associated with the counters of phase detectors 61 and 62 are multiplied by the limited DS/SS signal appearing on line 53. If the receive signal is in phase with the pulse train of a given detector, then the carrier component of the received DS/SS signal will be fully demodulated, leaving only the chip sequence to be despread from the data. However, if the receive signal is exactly 90° out of phase with the counter, then the receive signal will go undetected. To eliminate the possibility of an undetectable transmitted signal, the present invention utilizes dual phase detectors that are offset from each other by 90°.

FIG. 6 shows a plot of signal amplitude versus phase for the outputs of both the inphase and quadrature phase detectors. The inphase detector signal is shown by a solid line and the quadrature detector signal is shown by a dashed line. As can be seen in FIG. 6, the worst case amplitude response is 50% of the maximum and occurs at either the 45° or 225° point. During operation, the integrate and dump filter samples the product of the received DS/SS signal and the locally generated carrier signal; recreating a representation of the original chip sequence. This is shown in FIG. 7 by way of example, where waveforms C and D are aligned and waveform F, corresponding to the original PN code sequence, is generated at one of the outputs of either the inphase or quadrature detectors 61 and 62, respectively. If one phase detector is in close alignment with the incoming DS/SS signal then its output will have a very high correspondence to the actual chip sequence. The minimum signal output from filter 36 results from a 45° phase error between the receive signal and the carrier pulse train FIG. 9 shows a more detailed logic diagram of the integrate and dump filter employed, wherein the receive signal is coupled by line 53 to EXCLUSIVE-OR gates 121 and 122. The other input of gate 121 is coupled to line 33 which is the carrier produced by carrier frequency divider 32. This clock frequency is also supplied to one input of EXCLUSIVE-OR gate 120. The other input of gate 120 is a frequency pulse train running at two times the carrier frequency. In the preferred embodiment, this two times carrier frequency component is also supplied by the carrier frequency divider circuit. EXCLUSIVE-OR gate 120 functions as quadrature generator 63 of FIGS. 2 and 4. The output of gate 120 is coupled to the second input of gate 122. Altogether, gates 120–122 operate in such a manner that the DS/SS receive signal appearing at the up/down (U/D-)input of counter 131 is phase demodulated 90° with respect to the DS/SS receive signal input to the U/D input of counter of 130. in practice, counters 130 and 131 may comprise any ordinary commercially-available up/down counter. Counters 130 and 131 are clocked by clock signal CLK0 which runs at eight times the carrier frequency and originates from the crystal resonator circuit. Thus, the counters count up or down at eight times the frequency of the carrier clock input. Their function is simply to accumulate the number of high or low pulses within a single chip duration.

Output 41 from data recovery unit 38 is used to sample the current sign of counters 130 and 131 and also to reset the counters. For instance, when a sampling pulse arrives to the reset pins of counters 130 and 131 on line 141, the state of those counters is sampled on line 142 and 143, respectively. If the counter has counted further up than down, then a "1" would be produced at the output of the counter, whereas if the opposite were true then a "0" would be produced. After resetting, the entire counting procedure begins over again.

The sampled output on line 142 is input to AND gate 133. The other input of AND gate 133 is coupled to the output of invertor 139 via line 141. The output of AND gate 133 is coupled to the input of OR gate 134. The other input to OR gate 134 is the output of AND gate 132. AND gate 132 has as its inputs the Q output of D flip-flop 145 and line 41. Line 41 is also input to invertor 139. AND/OR gates 135–137 and D flop-flop 144 are arranged in a manner as described above with respect to counter output line 143. This arrangement stores the state of lines 142 and 143 in D flip-flop 145 and 144, respectively, each time line 41 is asserted.

Referring now to FIGS. 2 and 4, the outputs of integrate and dump detectors 61 and 62 are coupled to correlators 78 and 79 along lines 66 and 67, respectively. Each correlator comprises a 63-bit linear shift register; each bit position corresponding to a single chip in the pseudonoise sequence. In operation, the shift register receives the input pseudonoise signal and correlates it with all possible code positions of the local pseudonoise code replica. The replica is implemented in the preferred embodiment of FIG. 4 by connecting each register of linear shift register 78 to a common summing node (e.g., 71); either through a resistor, such as 68, or through the series combination of an invertor and a resistor (e.g., elements 69 and 70, respectively). Summing node 71 is coupled to acquisition window voltage comparator 73, track window voltage comparator 74, data value voltage comparator 108 and difference voltage comparator 77. In a similar fashion, summing node 72 of shift register 79 is coupled to comparators 75, 76, 77 and 108.

The correlation operation is performed in parallel, and as such, the corresponding correlator outputs all pertain to the identical observation of received signal plus noise. The correct pseudonoise alignment is detected when a local code phase position produces a maximum detector output which exits the window defined by $V_{ref1}$ and $V_{REF4}$ of voltage comparator 74. (Alternatively, correct PN code alignment could occur in shift register 79, in which case maximum outputs would be sensed by comparator 76). In like manner, comparators 73 and 75 produce outputs, using a narrower reference window. to sense and correct chip position drift.

The acquisition/decoding procedure of the present invention clearly has the advantage that a definite decision will be made after only a single examination of all code phase positions, or a single search through the entire code. Thus, multiple examination of each code phase position or multiple searches through the code are avoided with this procedure.

FIG. 5 illustrates the autocorrelation function (R(t)) for a given chip sequence of 63 bits in length. A positive autocorrelation of +1 corresponds to exact alignment of the demodulated DS/SS signal with the replica pseudonoise code, e.g., the data bit is a "1", while a negative autocorrelation of −1 corresponds to a replica pseudonoise code that is in exact alignment with an inverted demodulated DS/SS signal, i.e., the data bit is zero.

Before the arrival of the 63rd chip in the received sequence, the outputs of voltage comparators 73 and 74, respectively, will produce a voltage corresponding to an autocorrelation function which is on the order of 1/63rd in magnitude. Upon the arrival of the 63rd chip (assuming that we have a sufficiently high signal to noise ratio) the autocorrelation function will either rise or fall dramatically—indicating the presence of a "1" or "0" data bit. Correlation is detected by comparators 73–76.

As should be evident from the foregoing discussion, the correlator of FIG. 4 is analog in nature. Alternatively, other forms of correlation might be utilized without departing from the spirit or scope of the present invention. By way of example, a digital comparator employing a Wallace-tree structure might be used instead of the analog summation and voltage comparators shown in FIG. 4.

Voltage comparator 108 uses a reference voltage $V_{ref0}$ to establish a threshold at approximately the midpoint (50% of the available voltage swing) of the correlation function. This voltage comparator detects the logic value of the signal. For example, when the positive threshold is exceeded, voltage comparator 108 produces a logic "1" on line 109.

If either 74 or 76 window is exceeded, data recovery unit 38 supplies a reset signal along line 57 to pseudonoise generator 39 resetting the chip sequence period. A reset signal is also provided on line 46 to reset divider 30. This provides a means for data recovery unit 38 to be synchronized with the incoming code so as to be able to anticipate when the next bit will arrive.

After two consecutive thresholds are exceeded for consecutive chip sequence cycles, the output from voltage comparators 74 or 76, is sampled to determine the level of the correlation function. Data recovery unit 38 simply counts through the 63 chips of the PN sequence. After the final chip, the correlator output is sampled to test the received correlation magnitude. If, at any time, eight consecutive triggers of the PN generator fail to produce a correlation, then state machine logic within the data recovery unit will conclude that the receive signal has been lost. At that point, the transceiver will again require two consecutive thresholds to be exceeded before data recovery can begin anew. The voltage threshold of comparators 74 and 76 is determined by $V_{ref1}$ and $V_{ref4}$. Typically, this threshold value is set close to ½ of the maximum magnitude zero, (e.g., ±1/63). It should be noted that the choice of the number of consecutive successful chip sequences required to declare a capture condition, and the number of failures before declaring the signal lost, is determined by the optimum false-alarm rate to failure-to-receive rate ratio for the specific application.

Referring now to FIG. 10, a state diagram of the system lock for the receiver employed in the present invention is shown. Prior to the acquisition of a transmitted DS/SS signal, the logic of data recovery unit 38 resides in state 0000. State 0000, as shown in the diagram, corresponds to the situation in which no initial bit has been received and no message presence confirmed.

The receiver will remain in state 0000 until a bit of data is detected by the correlators. When an initial bit has been detected, the chip counter and pseudonoise shift registers are reset by data recovery unit 38 along lines 46 and 57, respectively. With the detection of an initial bit, the system transitions to new state 0001. The system will remain in this state until a final chip has been detected. If a final chip is detected with no bit present the system returns to state 0000. When a bit is present and a final chip is detected the system transitions to state 1001 where it again waits for another chip to occur. Once an initial bit has been detected and a final chip is received from PN generator 39 along line 58 the message presence is confirmed in state 1001 and a lock is declared. The system will remain locked unless eight consecutive chip periods pass in which no bit has been detected. This is shown by states 1001 through 1111. The system transitions, for example, between states 1001 and 0101 when a final chip is received and no bit is detected to be present. If at any time, a final chip of the spread spectrum sequence is received along with a bit present then the system returns to state 1001 to confirm the message presence. If the system is in state 1111 and a final chip is received with no bit present, then the system returns to state 0000. By returning to state 0000 the system is declaring that the received signal has been lost.

After a lock has been declared, the absolute magnitude of the quadrature and in-phase channel components is compared, and the carrier counter incremented or decremented as appropriate. The carrier counter is advanced or retarded using line 35 which couples the data recovery unit 38 to divider 32. Voltage comparator 77 is used to sense the relative difference in strength between the voltages appearing on summing nodes 71 and 72. The outputs of comparator 77 produces a decision signal on line 59 within data recovery unit 38. This decision signal is used to define which branch of the correlator has the stronger signal. Thus, correlator 37 and data recovery unit 38 function to correct for slight deviations in the frequency between the received DS/SS signal and the locally generated carrier. Moreover, the correlator outputs (74 or 76) are tested one chip early and one chip late. If either threshold is exceeded, the chip counter is advanced or retarded by a quarter of a chip, e.g., one carrier pulse, as appropriate. The chip frequency divider is advanced or retarded by track logic and data recovery unit 38 through the signals carried by line 46. (Line 46 is also used to reset chip frequency divider 30 after an initial bit is detected.)

Consider, by way of example, a situation in which the inphase path is producing a larger signal than the quadrature path. Data recovery unit 38 will send a signal along line 35 to the counter of carrier frequency divider 32 to slow the frequency of the carrier pulse train. This adjustment, retards both carrier signals, retaining the 90° separation. If the in-phase signal is consistently larger than the quadrature signal, then the counter will be advanced. The additional pulses are provided by clock generator 24 which is operating at a frequency 8 times that of the carrier. This technique of adding and subtracting pulses maintains alignment of the received DS/SS signal and the locally generated carrier within the phase region 0°–90° (or alternatively, 180°–270°). In any event, synchronous operation of the correlation detector of the present invention requires little correction since phase drift between the incoming carrier and the receiver's local generator 32 over a correlation interval is only a small fraction of a radian due to the use of identical crystal oscillators.

Referring now to FIG. 11, a block diagram of the track logic and data recovery circuit unit 38 is shown. Unit 38 comprises message capture logic circuitry 125 which receives "bit present" inputs 54 and 55 from correlaters 78 and 79, respectively. Logic unit 125 also receives the final chip and mid-count strobe from PN generator 39 along line 58, and is strobed at the chip frequency along line 40. When an initial bit is detected, unit 125 outputs a signal (i.e., IW) on line 57 to reset PN generator 39.

Chip track logic unit 128 also receives inputs on lines 54, 55 and 58 as well as the "lock" output of unit 125 along line 146. Furthermore, unit 128 receives early chip and late chip inputs on lines 131 and 132, respectively from state decoder 130. These signals are generated prior to, and following the final chip, as is shown in FIG. 12. When a lock is detected, unit 128 resets the chip frequency divider 30 along line 46. Line 42 is used to either advance or retard the chip counter frequency by a quarter of a chip as appropriate. Logically, the operations of unit 128 can be written in boolean form as follows:

---
If $(\overline{T/R} \cdot W \cdot \overline{IW}) \rightarrow$ Reset Divider and PN Generator
If $(\overline{T/R} \cdot \overline{Flag} \cdot LOCK \cdot Early\ Chip \cdot TW) \rightarrow$ Advance Counter, Set Flag
If $(\overline{T/R} \cdot \overline{Flag} \cdot LOCK \cdot Late\ Chip \cdot TW) \rightarrow$ Retard Counter, Set Flag
Else Chip Frequency Divider and PN Generator Count Normally
---

Where "T/R" represents the transmit/receive signal of line 17, "TW" is the track chip present signal produced by ORing lines 54 and 55, and "Flag" in an internal signal used to prevent ambiguous decode when the counter state is modified. (If a mid-chip is detected then "Flag" is reset to zero).

Data recover logic unit 126 receives as inputs the "LOCK" output along line 146, the final chip (FC) along line 58 and the data value (VAL) on line 109. The output of unit 126 is produced along line 148, which is input to data output logic unit 127.

The recovered data is delivered to data line 60 along line 36, while line 37 is used to enable/disable driver 18. Data recovery logic units 126 and 127 operate as follows:

---
If $(FC \cdot VAL) \rightarrow$ Set Data FF
If $(FC \cdot \overline{VAL}) \rightarrow$ Reset Data FF
If $(\overline{T/R} \cdot LOCK) \rightarrow$ Output Tri-State Enable
---

Where "Data FF" represents either of flip-flops 144, 145.

Phase sense logic unit 129 receives as inputs the bit values generated on lines 50 and 51 from the correlators 78 and 79, respectively, and also the different signal produced on line 59 from comparator 77. Unit 129 senses which line has the stronger signal and provides this information on output line 147 to logic unit 127. When the XMIT/RCV signal on line 17 indicates that the transceiver is operating in receiver mode, output logic unit 127 provides appropriate signals on line 36 and 35 to tri-state buffer 18. In this way, transmission is halted when the transceiver is operating in receive mode.

FIG. 11 also includes carrier frequency divider control logic unit 132 which comprises the remainder of data recovery unit 38. The output of unit 132 represents a phase tracker strobe which is used to either increment or decrement the carrier counter as appropriate. Once again, the operation of unit 132 is described logically as:

If $(\overline{T/R} \cdot LOCK \cdot FC \cdot (DIFF \oplus VAL)) \rightarrow$ Advance Counter
If $(T/R \cdot LOCK \cdot FC \cdot \overline{(DIFF \oplus VAL)}) \rightarrow$ Retard Counter
Else Carrier Frequency Divider Counts Normal

III. Discussion of the Embodiment(s) of FIGS. 13–16

The transceiver described thus far has a fixed spreading sequence and a fixed ratio between the chip rate and the carrier frequency. However, in many cases it is desirable to provide for multiple communications channels to further increase the rejection of unwanted interference and to facilitate greater information flow.

To provide for multiple communications channels on a single transmission medium, selectable carrier frequencies and/or selectable spreading sequences are required. Separating channels by using selectable frequencies is commonly referred to as Frequency Division Multiple Access (FDMA). Separating channels using selectable spreading sequences is commonly referred to as Code Division Multiple Access (CDMA).

Ordinarily, the number of channels available using FDMA techniques is limited by the available bandwidth. Similarly, the number of channels available using CDMA techniques is limited by the need to select a set of spreading sequences having a high level of orthogonality (such as Gold codes) from a finite number of codes available. Utilizing both forms of multiplexing provides a number of channels equal to the number of channels provided by the FDMA technique multiplied by the number provided by the CDMA technique.

With reference to FIG. 13, there is shown an improved correlator which provides a means for modifying the psuedonoise chip sequence. The improved cormlater of FIG. 13 is similar to correlator 78 of FIG. 4, except that a new register is included along with additional supporting logic. The new shift register is illustrated as having register locations labeled "code $chip_1$", "code $chip_2$,". . . "code $chip_{63}$". Each of the register locations is coupled to shift enable line 165. The code sequence data enters the register along line 166 coupled to register location code $chip_1$. From there the code sequence data proceeds serially through the register along lines 168, 169, and so on.

The new register defines the weighting value (1 or 0) to be associated with each stage of the correlation register and is preferably implemented as a shift register accessible to the neuron or other controller. Each stage of the new register is combined with the corresponding stage of the correlation register (having register locations labeled $chip_1$, $chip_2$, . . . $chip_{63}$) via an exclusive-OR (XOR) gate, as shown in FIG. 13.

By way of example, the output of register location code $chip_1$, provided on line 168, is coupled to one input of 2-input XOR gate 161. The other input of XOR gate 161 is coupled to correlation register location $chip_1$. The output of XOR gate 161 is coupled through resistor 168 to summing line 71. Summing line 71 functions in the identical manner as described in connection with FIG. 4. That is, the voltages produced along line 71 are summed to produce a voltage which is then compared, using comparator 73 and 74, to various reference voltages $V_{ref1}$–$V_{ref4}$. For situations in which the particular code sequence employed requires that a given shift register location be inverted, then an exclusive-NOR (XNOR) gate is utilized rather than an XOR gate. For instance, XNOR gates 162 and 163 are employed at corresponding correlation registers locations $chip_2$ and $chip_{63}$, respectively in accordance with the chip sequence provided in Appendix 1. Thus, the contents of the new register (i.e., code $chip_1$, code $chip_{63}$) modifies the weighting function of the correlation registers (i.e., $chip_1$–$chip_{63}$) to decode the selected spreading sequence.

Note that an auxiliary counter must be added to provide the timing for the early-chip, the prompt-chip, the late-chip and the mid-chip which are used in the acquisition and tracking operations while receiving data. In addition, a means of modulating a data stream with the selected spreading sequence is required. This means is provided by the AND-OR networks coupled to the inputs of each of the correlation registers $chip_1$–$chip_{63}$.

In FIG. 13, the output of the in-phase detector 61 provided along line 66 is ANDed by gate 149 with shift/lead signal provided on line 167. The output of AND gate 149 is coupled to one input of 2-input OR gate 151. The other input of gate 151 is coupled to the output of AND gate 150. AND gate 150 has as its inputs the output of new register location code $chip_1$, provided on line 168, and the shift/load signal by inverter 152. The output of OR gate 151 is shifted into the correlation register at location $chip_1$. In like manner, AND gates 153 & 154 and OR gate 155 provide the input to correlation register location $chip_2$. Similarly, the AND-OR network comprising gates 156, 157 and 158 provide the input to the last register location in the chip sequence (e.g. $chip_{63}$).

By providing the AND-OR logic to lead a given correlation register with the contents of the associated new register as each data bit becomes available, the selected sequence may be shifted sequentially through the correlation register and applied to the bit of the data stream for transmission. It is appreciated that the loading operation must by synchronized with the data stream in order for this to occur. This requires that the controller be synchronous with the transmitter or that a FIFO (or its equivalent) be used to allow synchronous buffering of the data.

As a part of the new register, which is required to specify the selected spreading sequence, two additional bits are select among a set of frequencies to provide additional channel capacity. These additional two bits are shown in FIG. 4 as cells 177 and 178. This aspect of the invention will be discussed in more detail below.

FIG. 14 illustrates a functional block diagram of the carrier and chip counters needed to provide for multiple frequency operations. Two divider chains divide the system clock, provided on line 25 by clock generator circuit 24, and generate the waveforms and timing required. The first divider chain is used to drive carrier frequencies and comprises modulo dividers 171–175, multiplexer (MUX) 176 and modulo-2 divider 180. The first stage of this chain (which is common to both the carrier generator chain and the chip timing chain) comprises 3-modulo stage 171 and modulo dividers 172–175. The 3-modulo stage 171 provides correction for the phase precession between the receiver and transmitter carriers. A detailed logic diagram of the currently preferred embodiment of the 3-modulo divider employed in the present invention is shown in FIG. 15.

As each chip is received, the magnitude of the outputs of the in-phase and quadrature channels of the correlation registers are compared and retard or advance strokes are generated so as to drive the magnitudes toward equality. The remaining stages allow division ratios of 2, 3, 4 or 6 to be selected by the contents of two stages of the control register comprising cells 171 and 178. These bits select which divide ratio is output on line 27 from MUX 176. For a 10K baud data rate, the division ratios of 2, 3, 4 or 6 correspond to carriers of 7.5 MHz, 5.04 MHz, 3.78 MHz and 2.52 MHz, respectively.

In the chip timing chain which includes divider stages 181–183, the system clock (provided on line 25 by generator 24) is divided by 96 such that the carry-out of this chain provides the strobe defining the chip edge. This strobe is used to shift the sequence generating register during transmission. One stage is arranged as a 3-modulo (1/2/4 modulo) counter stage (see FIG. 15) to provide the necessary time modifications to correct for timing errors due to the phase precession between the transmitting and receiving transmitters. Normal operation is as a divide-by-2 stage.

As each chip is received, the amplitude of the chip in an early-chip and a late-chip time position is tested and a one-clock-interval retard stroke is generated if a received chip is perceived in the late-chip slot, or an advance strobe generated if a receive chip is perceived in the early-chip slot. The retard strobe inhibits the generation of one carry to the succeeding stages of the correlator and the advance strobe allows an extra carry to be produced. Each strobe causes the timing waveforms to be advanced or retarded by one quarter of a chip interval as appropriate to maintain synchronous operation.

When in the receive mode, the clock is used to sample the received signal. The value of each sample (e.g. +1 or −1) is accumulated in the integrate and dump register (either register 145 or register 144 of FIG. 9). The sign of the net value of the 96 samples in the register is used as the chip value shifted into the correlation registers. Note that the embodiments of FIGS. 13 and 14 are based on a requirement that the use of multiple carrier frequencies be possible with a fixed data rate. An alternative approach could be used wherein the spreading sequence is transmitted at base band and the data rate is varied to provide a fixed chip-to-bit ratio while separating the signal energy in separate sections of the frequency spectrum. This would reduce the complexity of the circuit since carrier tracking would not be required and the quadrature register could be eliminated. A frequency ratio of about 1.5 to 1.0 between adjacent channels may provide adequate separation between channels of equal power levels.

FIG. 15 illustrates the currently preferred embodiment of the 3-modulo (1/2/4 modulo) counter stage employed in FIG. 14. In the circuit of FIG. 15, the CarryIn input signal is supplied to modulo-2 divider 188. The output of divider 188 is supplied on line 187 labeled OUT. Phase advance and phase retard signals are supplied to the "J" inputs of J-K flip-flops 194 and 195 as shown (Flip-flop 194 is shown with the label "A," while flip-flop 195 is labeled "B"). Various and/or logic is utilized such that the output on line 198 is given by the equation:

CarryOut=(A)*Carryin*OUT(+)B*OUT where "A" and "B" represent the non-inverting output state of flip-flops 194 and 195, respectively. A state diagram of the counter of FIG. 15 is illustrated in FIG. 16. In FIG. 16, individual states are denoted by the output states of flip-flops 194 and 195 (written as "AB"

where A and B represent flop-flops 194 and 195, respectively).

Thus, a transceiver employing direct sequence spread spectrum communications techniques has been described.

| | Appendix I - Sample PN Code | | | | |
|---|---|---|---|---|---|
| 1st Stage | | | | | 6th Stage |
| A | B | C | D | E | F |
| 1 | 1 | 0 | 0 | 0 | 0 | 0 |
| 2 | 1 | 1 | 0 | 0 | 0 | 0 |
| 3 | 1 | 1 | 1 | 0 | 0 | 0 |
| 4 | 1 | 1 | 1 | 1 | 0 | 0 |
| 5 | 1 | 1 | 1 | 1 | 1 | 0 |
| 6 | 1 | 1 | 1 | 1 | 1 | 1 |
| 7 | 0 | 1 | 1 | 1 | 1 | 1 |
| 8 | 1 | 0 | 1 | 1 | 1 | 1 |
| 9 | 0 | 1 | 0 | 1 | 1 | 1 |
| 10 | 1 | 0 | 1 | 0 | 1 | 1 |
| 11 | 0 | 1 | 0 | 1 | 0 | 1 |
| 12 | 1 | 0 | 1 | 0 | 1 | 0 |
| 13 | 1 | 1 | 0 | 1 | 0 | 1 |
| 14 | 0 | 1 | 1 | 0 | 1 | 0 |
| 15 | 0 | 0 | 1 | 1 | 0 | 1 |
| 16 | 1 | 0 | 0 | 1 | 1 | 0 |
| 17 | 1 | 1 | 0 | 0 | 1 | 1 |
| 18 | 0 | 1 | 1 | 0 | 0 | 1 |
| 19 | 1 | 0 | 1 | 1 | 0 | 0 |
| 20 | 1 | 1 | 0 | 1 | 1 | 0 |
| 21 | 1 | 1 | 1 | 0 | 1 | 1 |
| 22 | 0 | 1 | 1 | 1 | 0 | 1 |
| 23 | 1 | 0 | 1 | 1 | 1 | 0 |
| 24 | 1 | 1 | 0 | 1 | 1 | 1 |
| 25 | 0 | 1 | 1 | 0 | 1 | 1 |
| 26 | 1 | 0 | 1 | 1 | 0 | 1 |
| 27 | 0 | 1 | 0 | 1 | 1 | 0 |
| 28 | 0 | 0 | 1 | 0 | 1 | 1 |
| 29 | 1 | 0 | 0 | 1 | 0 | 1 |
| 30 | 0 | 1 | 0 | 0 | 1 | 0 |
| 31 | 0 | 0 | 1 | 0 | 0 | 1 | ←Mid Chip |
| 32 | 1 | 0 | 0 | 1 | 0 | 0 |
| 33 | 1 | 1 | 0 | 0 | 1 | 0 |
| 34 | 1 | 1 | 1 | 0 | 0 | 1 |
| 35 | 0 | 1 | 1 | 1 | 0 | 0 |
| 36 | 0 | 0 | 1 | 1 | 1 | 0 |
| 37 | 0 | 0 | 0 | 1 | 1 | 1 |
| 38 | 1 | 0 | 0 | 0 | 1 | 1 |
| 39 | 0 | 1 | 0 | 0 | 0 | 1 |
| 40 | 1 | 0 | 1 | 0 | 0 | 0 |
| 41 | 1 | 1 | 0 | 1 | 0 | 0 |
| 42 | 1 | 1 | 1 | 0 | 1 | 0 |
| 43 | 1 | 1 | 1 | 1 | 0 | 1 |
| 44 | 0 | 1 | 1 | 1 | 1 | 0 |
| 45 | 0 | 0 | 1 | 1 | 1 | 1 |
| 46 | 1 | 0 | 0 | 1 | 1 | 1 |
| 47 | 0 | 1 | 0 | 0 | 1 | 1 |
| 48 | 1 | 0 | 1 | 0 | 0 | 1 |
| 49 | 0 | 1 | 0 | 1 | 0 | 0 |
| 50 | 0 | 0 | 1 | 0 | 1 | 0 |
| 51 | 0 | 0 | 0 | 1 | 0 | 1 |
| 52 | 1 | 0 | 0 | 0 | 1 | 0 |
| 53 | 1 | 1 | 0 | 0 | 0 | 1 |
| 54 | 0 | 1 | 1 | 0 | 0 | 0 |
| 55 | 0 | 0 | 1 | 1 | 0 | 0 |
| 56 | 0 | 0 | 0 | 1 | 1 | 0 |
| 57 | 0 | 0 | 0 | 0 | 1 | 1 |
| 58 | 1 | 0 | 0 | 0 | 0 | 1 |
| 59 | 0 | 1 | 0 | 0 | 0 | 0 |
| 60 | 0 | 0 | 1 | 0 | 0 | 0 |
| 61 | 0 | 0 | 0 | 1 | 0 | 0 |
| 62 | 0 | 0 | 0 | 0 | 1 | 0 |
| 63 | 0 | 0 | 0 | 0 | 0 | 1 | ←Final Chip |

What is claimed is:

1. An integrated circuit for transmitting and receiving digital information across various communications media comprising:

a generator for generating a reference frequency;

a transmitter for modulating a predetermined spread spectrum signal with a digital bit stream using binary phase shift keying for transmission to another integrated circuit under control of said reference frequency;

a receiver for acquiring and decoding with a local predetermined sequence, a previously transmitted spread spectrum signal modulated using binary phase shift keying to recover said digital bit stream; and wherein said predetermined spread spectrum signal has a fixed relationship to said local predetermined sequence and each of said predetermined spread spectrum signal and said local predetermined sequence has a fixed relationship to said reference frequency.

* * * * *

UNITED STATES PATENT AND TRADEMARK OFFICE
CERTIFICATE OF CORRECTION

PATENT NO.   : 5,357,541
DATED        : Oct. 18, 1994
INVENTOR(S)  : Brooks E. Cowart It is certified that error appears in the above-indentified patent and that said Letters Patent is hereby corrected as shown below:

On title page, add the statement "Notice; the portion of the term of this patent subsequent to December 18, 2007, has been disclaimed."

Signed and Sealed this

Sixth Day of June, 1995

*Attest:*

BRUCE LEHMAN

*Attesting Officer*   Commissioner of Patents and Trademarks